(12) United States Patent
Bruck

(10) Patent No.: US 10,195,962 B2
(45) Date of Patent: Feb. 5, 2019

(54) POWER SEAT ASSEMBLY WITH SPRING LOADED SEATBACK DUMP AND MOTOR DRIVEN DESIGN REWIND AND RESET FUNCTIONALITY

(71) Applicant: BAE Industries, Inc., Auburn Hills, MI (US)

(72) Inventor: Stephen C. Bruck, Howell, MI (US)

(73) Assignee: BAE Industries, Inc., Warren, MI (US)

( * ) Notice: Subject to any disclaimer, the term of this patent is extended or adjusted under 35 U.S.C. 154(b) by 71 days.

(21) Appl. No.: 15/646,703

(22) Filed: Jul. 11, 2017

(65) Prior Publication Data

US 2018/0015843 A1    Jan. 18, 2018

Related U.S. Application Data

(60) Provisional application No. 62/362,476, filed on Jul. 14, 2016.

(51) Int. Cl.
*B60N 2/02* (2006.01)
*B60N 2/20* (2006.01)
(Continued)

(52) U.S. Cl.
CPC ............ *B60N 2/0232* (2013.01); *B60N 2/20* (2013.01); *B60N 2/2213* (2013.01);
(Continued)

(58) Field of Classification Search
CPC ...... B60N 2/0232; B60N 2/20; B60N 2/2213; B60N 2/2352; B60N 2002/0236; B60N 2002/024; B60N 2205/35
See application file for complete search history.

(56) References Cited

U.S. PATENT DOCUMENTS

| 3,382,527 A | 5/1968 | Strien et al. |
| 4,781,416 A | 11/1988 | Johnson et al. |

(Continued)

FOREIGN PATENT DOCUMENTS

| EP | 260849 A2 | 3/1988 |
| JP | 5309026 B2 | 10/2013 |

*Primary Examiner* — Philip F Gabler
(74) *Attorney, Agent, or Firm* — Dinsmore & Shohl LLP

(57) ABSTRACT

A seatback assembly pivotally supported upon a seat bottom and including each of forward spring assisted dump, rewind and reset protocols. A stationary sector is affixed to the seat bottom and has an abutment edge. A seatback sector is pivotally secured to the stationary sector and is influenced relative thereto in a forward rotating dump direction. A cam is rotatably supported upon the pivoting seatback sector, the cam having an outer engaging edge in abutting contact with the abutment edge for maintaining the seatback sector in an upright design position. A rotating sector plate is arranged in stacked fashion with the stationary and pivoting seatback sectors, the sector plate exhibiting a plurality of outer circumferentially arrayed teeth. A pinion gear extends from a pivot axis established between the cam and seatback sector, the gear engaging the outer arrayed teeth of the sector plate. Upon the cam being rotated out of engagement with the stationary sector, the seatback rotates to a forward dump position, with subsequent rotation of the pinion gear rotatably displacing the sector plate and the seatback in slaved fashion to retract the seatback to the upright design position, with a concluding and counter-rotation of the pinion gear counter-rotating and resetting the sector plate independently of the seatback sector to a final reset position.

18 Claims, 25 Drawing Sheets

(51) Int. Cl.
*B60N 2/235* (2006.01)
*B60N 2/22* (2006.01)

(52) U.S. Cl.
CPC ...... *B60N 2/2352* (2013.01); *B60N 2002/024* (2013.01); *B60N 2002/0236* (2013.01); *B60N 2205/35* (2013.01)

(56) References Cited

U.S. PATENT DOCUMENTS

| | | |
|---|---|---|
| 5,163,735 A | 11/1992 | Aljundi |
| 5,322,346 A | 6/1994 | Notta et al. |
| 6,805,650 B2 | 10/2004 | Branov et al. |
| 7,661,760 B2 | 2/2010 | Nakaya et al. |
| 7,775,594 B2 | 8/2010 | Bruck et al. |
| 8,056,981 B2 | 11/2011 | Kojima et al. |
| 8,388,067 B2 | 3/2013 | Hida et al. |
| 8,585,148 B2 | 11/2013 | Yamada et al. |
| 8,746,773 B2 | 6/2014 | Bruck |
| 8,864,210 B2 | 10/2014 | Bruck |
| 8,985,691 B2 | 3/2015 | Tsuruta et al. |
| 9,022,479 B2 | 5/2015 | Hellrung et al. |
| 9,290,115 B2 | 3/2016 | Lutzka et al. |
| 2007/0126272 A1 | 6/2007 | Deptolla |
| 2008/0231103 A1 | 9/2008 | Rohee |
| 2009/0079248 A1 | 3/2009 | Keyser et al. |
| 2010/0308634 A1 | 12/2010 | Narita et al. |
| 2011/0084531 A1 | 4/2011 | Hida et al. |
| 2012/0248841 A1 | 10/2012 | Hellrung et al. |
| 2013/0026806 A1 | 1/2013 | Yamada et al. |
| 2018/0015843 A1* | 1/2018 | Bruck .................. B60N 2/2213 |
| 2018/0015850 A1* | 1/2018 | Bruck .................. B60N 2/3013 |

* cited by examiner

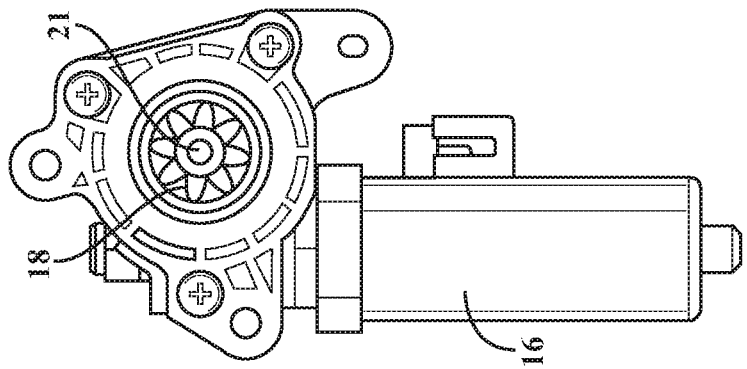
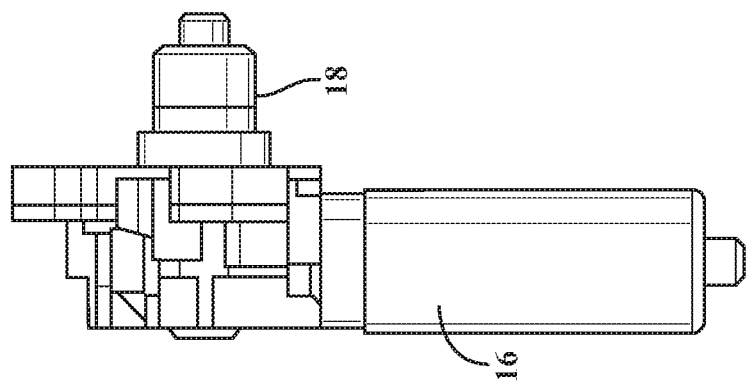
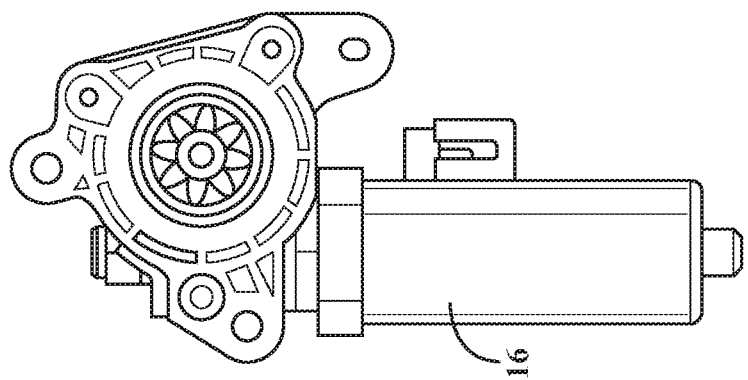
FIG. 2A

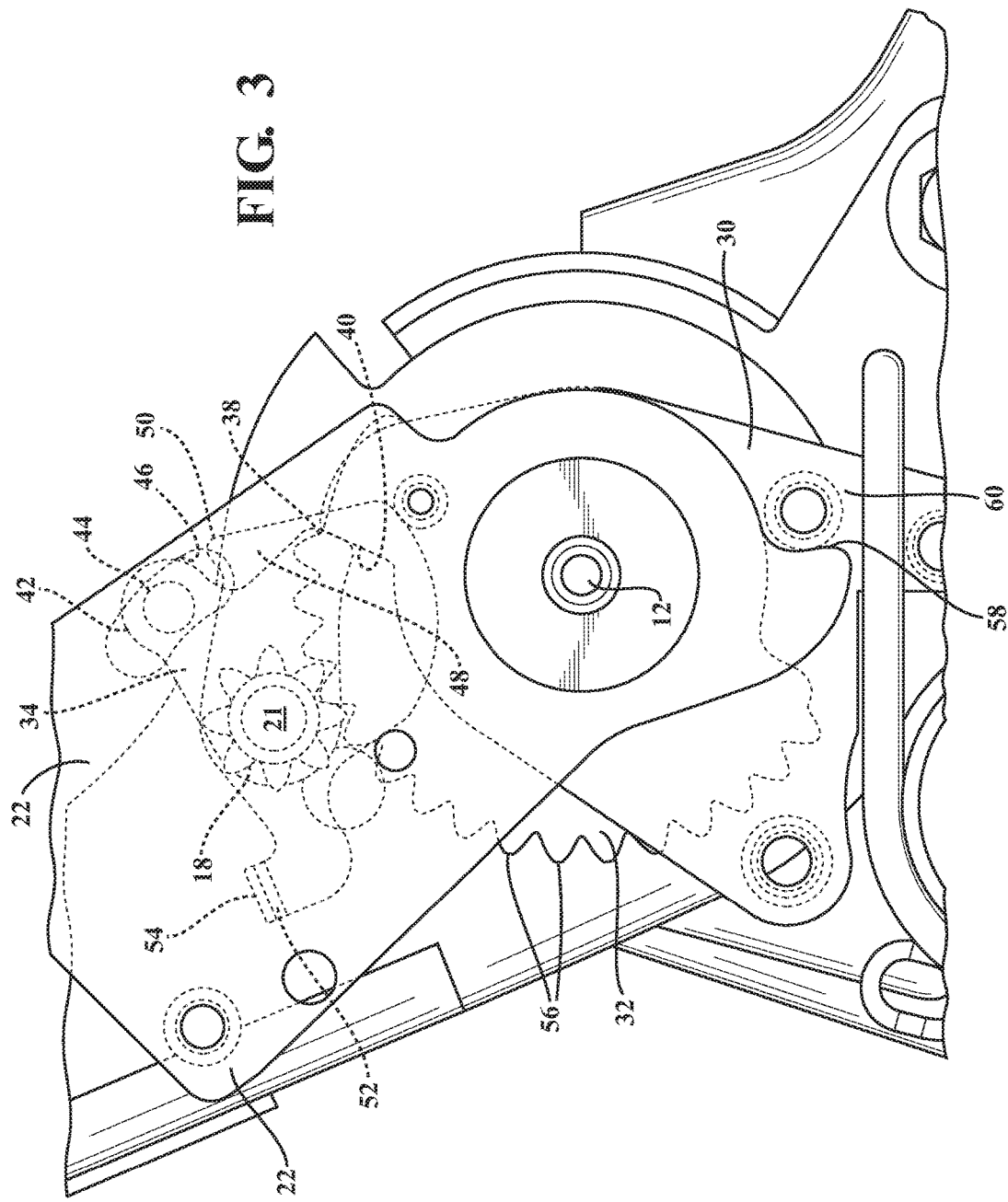

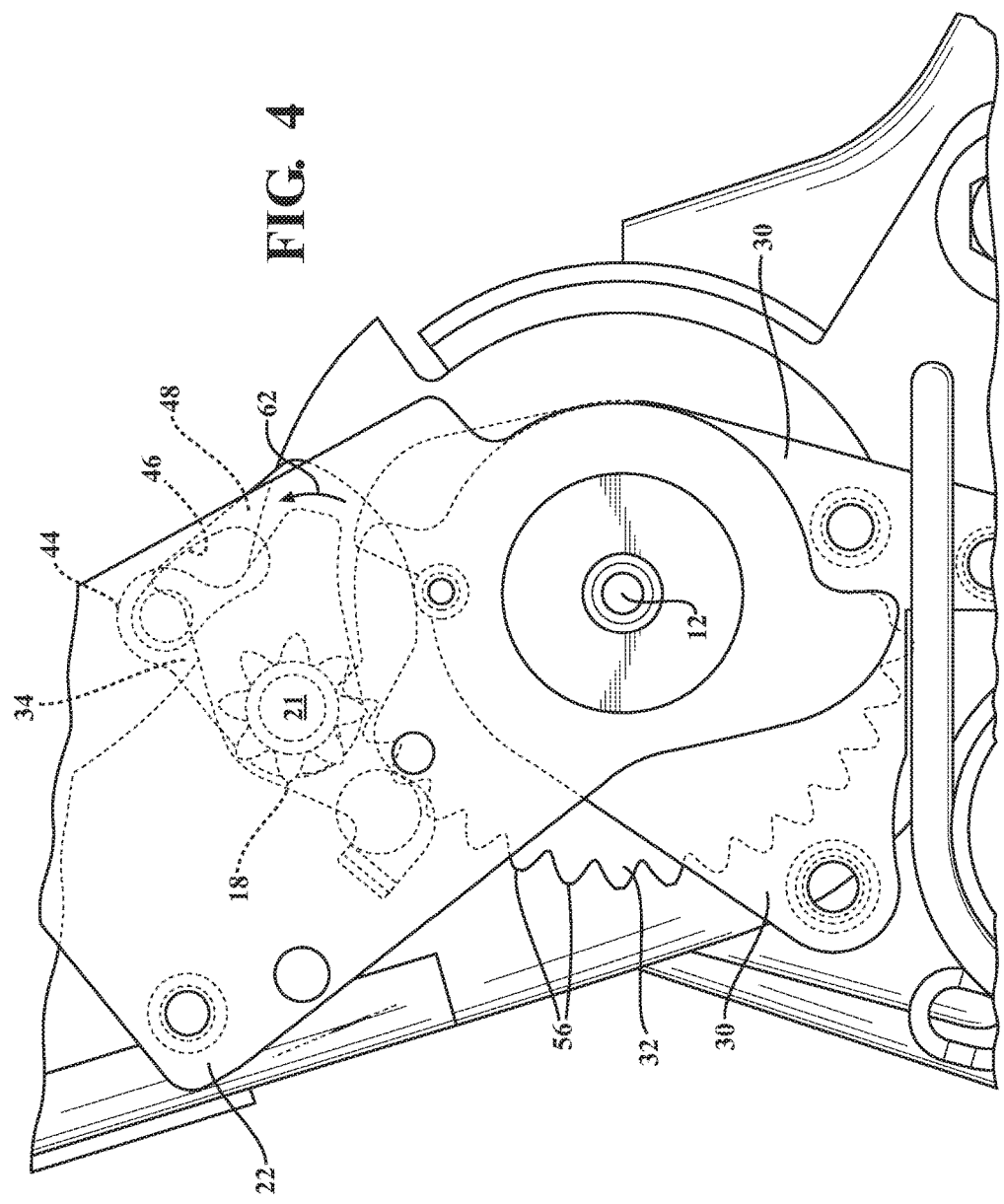

POWER SEAT ASSEMBLY WITH SPRING LOADED SEATBACK DUMP AND MOTOR DRIVEN DESIGN REWIND AND RESET FUNCTIONALITY

CROSS REFERENCE TO RELATED APPLICATIONS

The present application claims priority of U.S. Ser. No. 62/362,476 filed Jul. 14, 2016.

BACKGROUND OF THE INVENTION

Field of the Invention

A rear row power seat assembly having a pivotally supported seatback biased in a forward dump fashion. A motor and pinion drive gear is mounted to the pivotal seatback and, upon disengaging a pivotal cam riding on the seatback from an abutment location of a first stacked sector plate, results in the seatback forward rotating to the dump position. The pinion drive gear is bi-directionally rotatable and includes a bushing for compensating for any minor misalignments occurring between the seatback supported pinion gear and a further stacked, exteriorly toothed and rotatable sector plate in engagement with the pinion gear. Following spring assisted forward dump of the seatback, the pinion driven gear is employed in a second upright design/rewind or $2^{nd}$ step for returning the seatback to the upright design position and, subsequently the direction of the pinion gear is reversed to reset the toothed and rotatable sector plate in a $3^{rd}$ reset step of the seatback.

Background of the Invention

The prior art is documented with examples of forward dump and power rewind of a seatback, such as associated with a rear row vehicle seat. A first example of this is depicted in U.S. Pat. No. 7,775,594 to Bruck et al. and which teaches a power seat assembly with motor actuated release and rewind of a seatback sector.

First and second support plates sandwich a forwardly biased seatback sector and a cam engaged with the seatback sector in an upright position. A first pin extends from said cam offset its pivotal connection and passes through a slot defined in the second support plate to define a range of pivotal motion of the cam. A toothed gear sector rotatably mounted to an exterior of the second support plates and exhibits a polygonal shaped portion as well as an end shoulder offset and inwardly recessed from exteriorly defined teeth and the polygonal shaped portion.

An electric motor includes an output gear in toothed engagement with the gear sector and for rotating the gear sector in a first direction so that the polygonal shaped portion contacts and deflects the pin and cam out of contact with the seatback, causing it to rotate to a forward dump position. A second pin extends from the seatback sector and contacts the end shoulder at the dump position, the motor rotating the gear sector in a second direction and forcibly rewinding the seatback sector, against its bias, to the upright design position coinciding with the cam re-engaging the seatback sector.

Other prior art examples include the seat latch assemblies of Bruck U.S. Pat. No. 8,864,210 and U.S. Pat. No. 8,746,773 for providing manual triggering and subsequent power rewinding of a seatback. A vertical support stanchion is secured to a floor location of a vehicle frame and an arm is pivotally supported at a lower end to an upper location of the stanchion.

In the instance of the '210 patent, the arm engages along a side location of a frame forming a portion of the seatback in a first upper design position. A lever and trigger initiates forward rotating dump of the seatback. An arrangement of linkage members are also located upon the inboard side of the stanchion for providing upright rewinding of the seatback and for subsequently resetting the linkage mechanism through the driving action of a motor operable drive shaft associated with lowermost pivotal mounting location of the stanchion support.

In the further instance of the '773 patent, the sector engages along a side location of a frame forming a portion of the seatback in a first upper design position. A lever and trigger initiates forward rotating dump of the seatback. A plurality of four linkage members are also located upon the stanchion and, in combination with a motor, provide upright rewinding of the seatback and subsequent resetting of the linkage mechanism.

SUMMARY OF THE PRESENT INVENTION

The present invention discloses a seatback assembly pivotally supported upon a seat bottom, the assembly including each of forward spring assisted dump, rewind and reset protocols. A stationary sector is affixed to the seat bottom and has an abutment edge. A seatback sector is pivotally secured to the stationary sector and is influenced relative thereto in a forward rotating dump direction. A cam is rotatably supported upon the pivoting seatback sector, the cam having an outer engaging edge in abutting contact with the abutment edge for maintaining the seatback sector in an upright design position.

A rotating sector plate is arranged in stacked fashion with the stationary and pivoting seatback sectors, the sector plate exhibiting a plurality of outer circumferentially arrayed teeth. A pinion gear extends from a pivot axis established between the cam and seatback sector, the gear engaging the outer arrayed teeth of the sector plate. Upon the cam being rotated out of engagement with the stationary sector, the seatback rotates to a forward dump position, with subsequent rotation of the pinion gear rotatably displacing the sector plate and the seatback in slaved fashion to retract the seatback to the upright design position, with a concluding and counter-rotation of the pinion gear counter-rotating and resetting the sector plate independently of the seatback sector to a final reset position.

Additional features include the pinion drive extending from an electric motor mounted to the pivoting seatback sector. A deflection absorbing bushing is integrated into the pinion gear for accommodating misalignment between meshing of the outwardly facing teeth of the pinon gear with those of the rotating sector plate.

The pivoting seatback sector further includes a pair of spaced apart sectors positioned on opposite sides of the stationary sector and the rotating sector plate, with the cam supported between the pair of spaced apart sectors. A clock spring is interposed about a pivot axis between the seatback and stationary sectors.

Other features include a lever stacked upon the cam and which is rotatable about a common pivot axis, the lever exhibiting an offset abutment surface which, when rotated in a selected direction, contacts an offset pin projecting from the cam in order to unseat the cam from abutting contact with the stationary sector. An actuating cable extends to a further pivotally offset location of the lever. The pivotal seatback sector further includes a lower arcuate surface having first and second circumferentially offset abutment locations which selectively are displaced into contact with a pin projecting from the stationary sector to define a pivoting range of the seatback.

BRIEF DESCRIPTION OF THE DRAWINGS

Reference will now be made to the attached drawings, when read in combination with the following detailed description, wherein like reference numerals refer to like parts throughout the several views, and in which:

FIG. 2A is an illustration of the drive motor associated with the power rewind/reset seat assembly of the present inventions;

FIG. 3 is a side plan illustration of an initial upright design position associated with the seatback assembly according to a first embodiment;

FIG. 4 is a succeeding illustration to FIG. 3 and showing the seatback sector pivotally supported cam initially rotated (either by a lever to cable arrangement engaged to an offset pivot location of the cam or by driving the pinion gear in a brief counterclockwise direction) so that an abutting edge thereof unseats from a shoulder of a fixed sector plate;

DETAILED DESCRIPTION OF THE PREFERRED EMBODIMENTS

Figure 1:
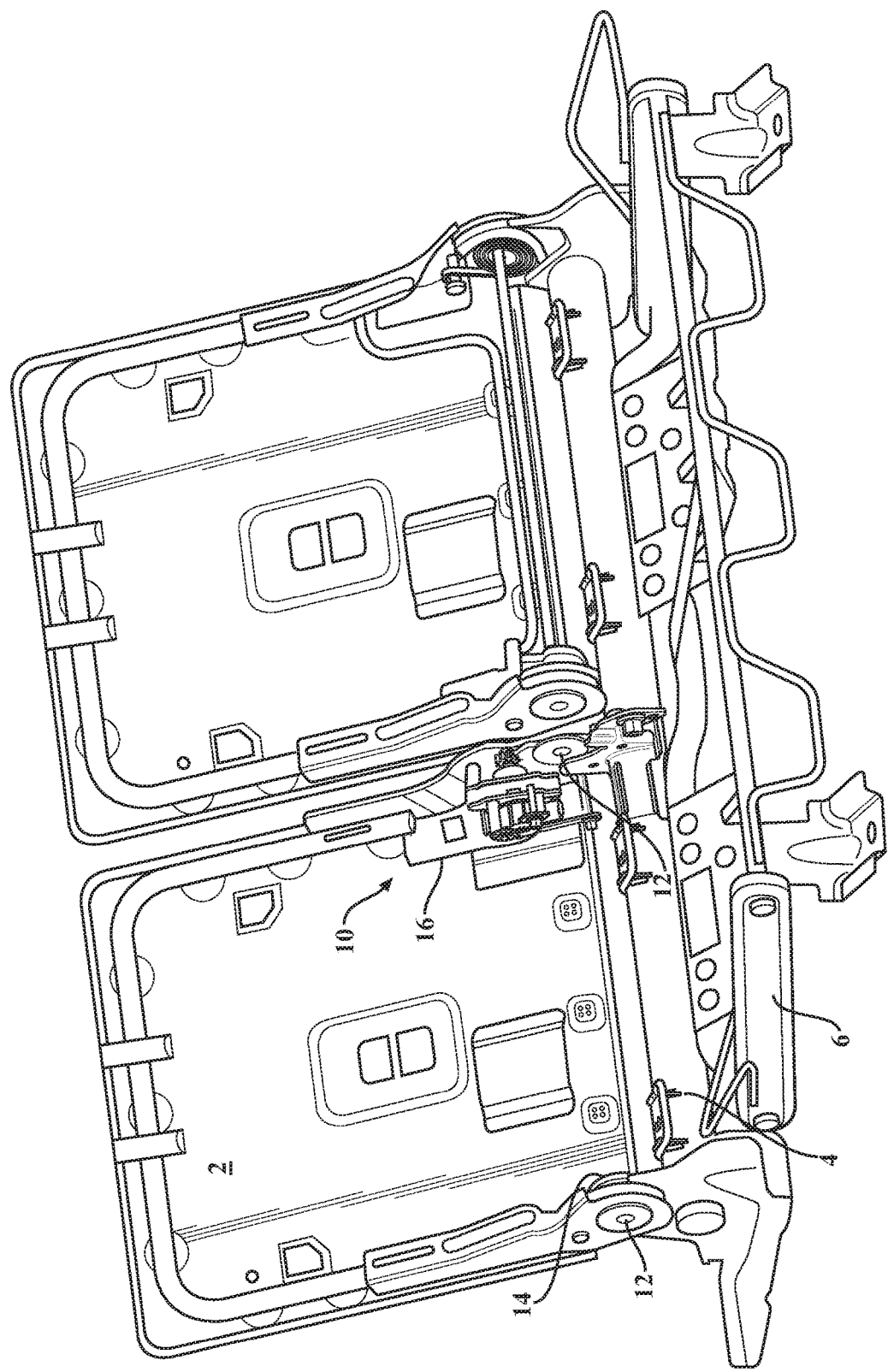
FIG. 1 is an environmental view of a rear row seat assembly according to one embodiment of the present inventions mounted to a pivoting seatback.

With referenced to the attached illustrations, the present inventions disclose related variants of a rear row power seat assembly, see as generally shown at 10, having a pivotally supported seatback biased in a forward dump fashion. The package assembly 10 is incorporated into a pivot location established between a pivotally supporting seatback frame portion 2 and a lower horizontal extending support 4 integrated into a fixed seat bottom frame portion 6 (see as best shown in FIG. 1).

The pivotal seat back and bottom supporting frame portions are known in the art and, as further shown, a second opposite side pivot location established between the seat back and seat bottom typically includes a dummy or free pivoting support, see at 12 in reference to both pivot locations for the main assembly 10 as well as the collinear spaced dummy pivots arranged on the opposite side of the seat back supporting frame. As with the seat assembly package 10, a clock spring 14 can be provided at the spaced apart dummy pivot (see also at 12') in order to influence the seat back to the forward dump position (according to the protocol to be subsequently described).

Figure 2:
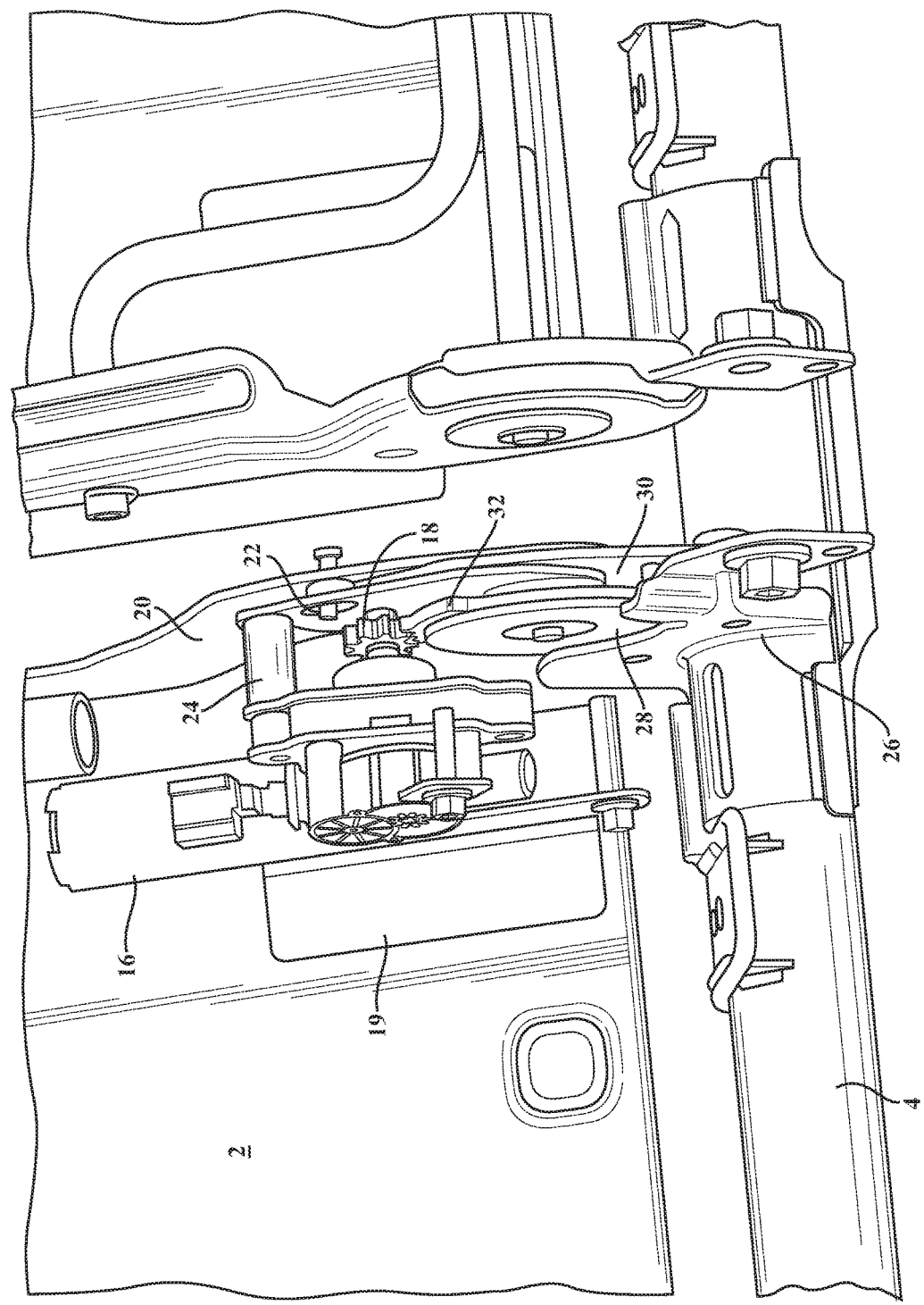
FIG. 2 is an enlarged view of FIG. 1 and better showing the seat assembly package pivotally mounted to the rear row seatback.

As further shown in FIG. 2, a motor 16 and pinion drive gear 18 is mounted to an underside frame location of the pivotal seatback 2 (see flange mount at 19). The package assembly further includes a generally elongated and plate shaped seatback sector 20 and a spaced apart and pivotally slaved second sector 22, with the motor 16 also secured to the second sector 22 via a collar mount 24.

As again depicted in FIG. 2, a fixed ISO bracket 26 secures to the horizontal frame bottom support 4, and to which in turn is affixed the seatback package 10, such further including a pair of inner-most 28 and outer spaced 30 and fixed sectors which pivotally support the pivoting seatback sectors 20 and 22. Additional features include a rotatable exteriorly toothed sector 32 (see again FIG. 2), such being sandwiched between the inner most fixed sector 28 and intermediate package positioned pivoting sector 22 and which is engaged by the outer annular teeth array of the motorized pinion gear 18. The pinion drive gear 18 further includes a central bushing 21 (see as best shown in FIG. 2A), such accommodating any minor misalignment in the seating of the pinion drive gear teeth and those of the exteriorly toothed sector 32. The pivoting sectors 20/22, fixed sectors 28/30 and rewind/exteriorly toothed plate 32 are again sandwiched about the main pivot location 12 in order to define a package assembly.

Also hidden from view in the package illustrations of FIGS. 2B-2C but, depicted in each of the subsequently presented protocols of FIGS. 3-11 and 12-18, is a cam 34, such pivotally attached to the seatback sector plate 20 about a main pivot collar 36 (FIG. 2C) and in co-linear engagement with the motor pinion drive gear 18. This arrangement is best shown in the enlarged illustration of FIG. 2 and, in combination with the plan view manual/spring biased forward dump, power rewind and reset steps of respective variants FIGS. 3-11 and 12-18, the cam 34 includes a body with a first abutment edge 38 in engagement with an opposite shouldering edge 40 associated with the outer spaced and fixed sector 30.

Figure 2B:
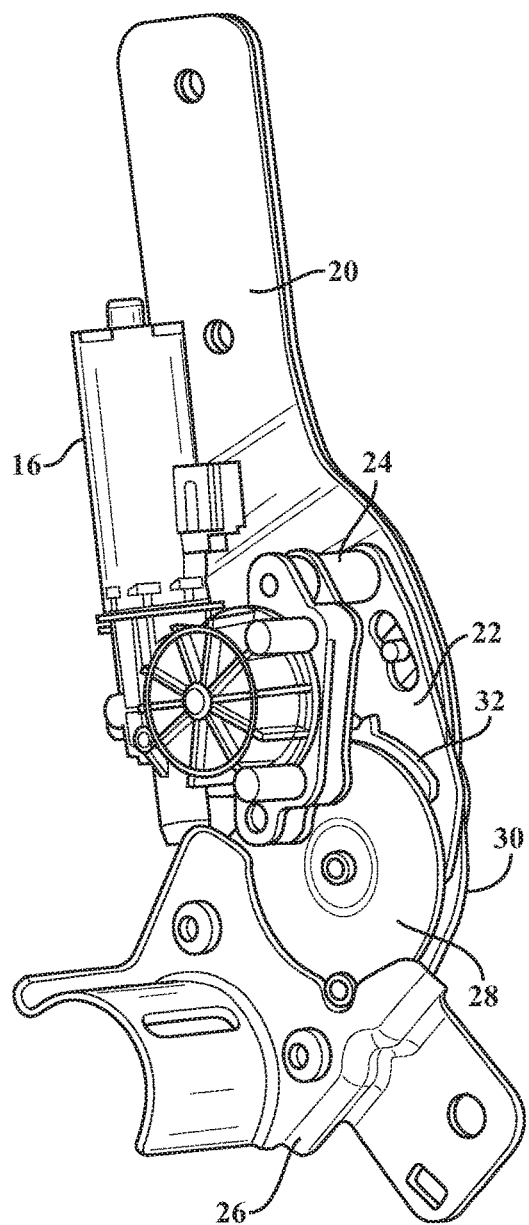
FIGS. 2B and 2C are first and second rotated assembled perspectives of the seat assembly package according to the present inventions interposed between the pivoting seat back and the seat bottom.
Figure 2C:
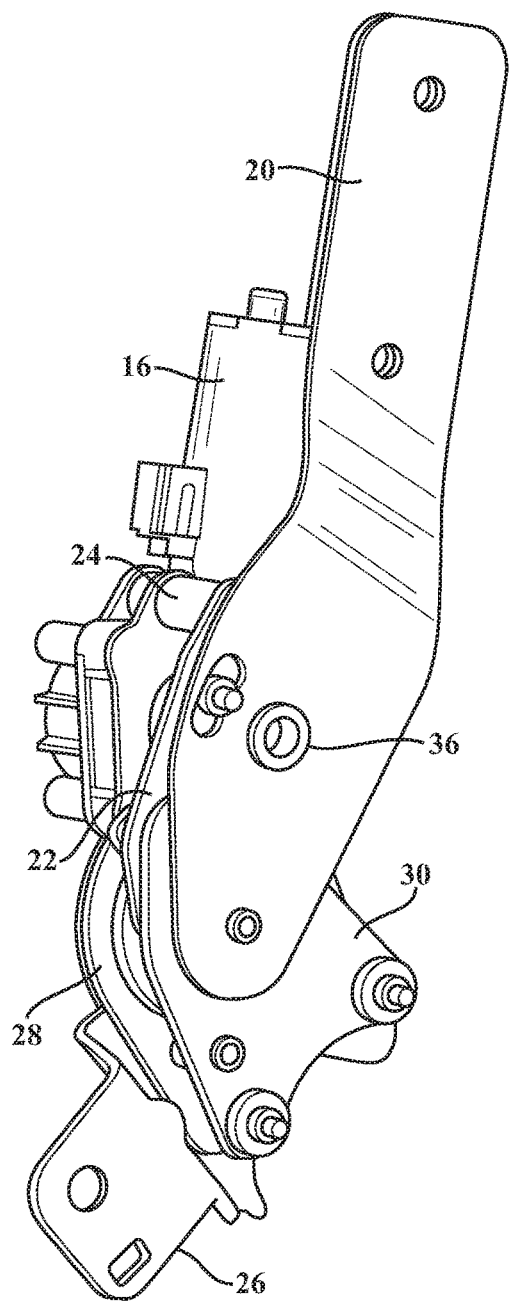

A further extending portion 42 of the cam 34 includes a pin 44 offset from the central pivot axis and which seats within an arcuate slot 46 configured in spaced apart and pivoting sector 22 (again FIGS. 2, 2B and 2C). An overlapping disengagement lever 48 is pivotally supported in stacked fashion over the cam 34 and exhibits a configured edge 50 in spaced proximity to the pin 44 which, upon pivoting of the lever 48 in a counter clockwise direction as further depicted in FIG. 3 by a displaceable cable 52 or the like extending to a further offset location 54 of the lever 48, causes unseating of the cam abutment edge 38 from the fixed sector 30 seating edge 40 in order to initiate the first step spring assisted manual forward dump (see clock springs 14 in FIG. 1).

As will be further explained in detail, and upon disengaging the pivotal cam 34 riding on the seatback (between spaced apart pivoting sectors 20 and 22 and in plan view alignment with inter-sandwiched and fixed or stationary sector plate 30) from the abutment location 40 of the stacked sector plate 30, results in the seatback (generally represented again at 2 in FIG. 2 and understood to correspond also to the spaced apart pair of pivotal components 20/22) rotating forwardly to the dump position. As will be further described, the pinion drive gear 18 is bi-directionally rotatable and, with the rubberized or otherwise offset displaceable bushing 21, compensates for any minor misalignments occurring between the seatback supported pinion gear 18 and the further stacked, exteriorly toothed and rotatatable sector plate 32 in engagement with the pinion gear 18 via an opposing and outwardly arrayed series of teeth 56. Following spring assisted forward dump of the seatback, the pinion drive gear 18 is employed in a second upright design/rewind or $2^{nd}$ step for returning the seatback (again sectors 20/22 and frame 2) to the upright design position and, subsequently the direction of the pinion gear 18 is reversed to reset the toothed and rotatable sector plates 20/22 in a $3^{rd}$ reset step of the seatback.

Given the above overall description, and referencing again initially FIG. 3, a side plan illustration is again shown of an initial upright design position associated with the seatback assembly according to a first embodiment. As further shown, outer spaced and pivoting sector 22 includes a lower configured abutting edge 58 which engages a pin 60 projecting from the fixed sector 30 and in order to define a fully upright position of the seatback.

FIG. 4 is a succeeding illustration to FIG. 3 and showing the seatback sector pivotally supported cam 34 initially rotated about arrow 62 (such as by the lever and cable arrangement as shown again at 52 in FIG. 3) engaged to the offset pivot location of the cam 34 (such as the pivoting of the lever 48 resulting in the edge 50 lifting the pin 44 and rotating the cam 34 along the slot 46). Alternatively, triggering of the cam 34 can be accomplished by driving the pinion gear 18 in a brief counterclockwise direction in order to rotate the cam out of contact with the fixed sector plate 30.

Figure 5:
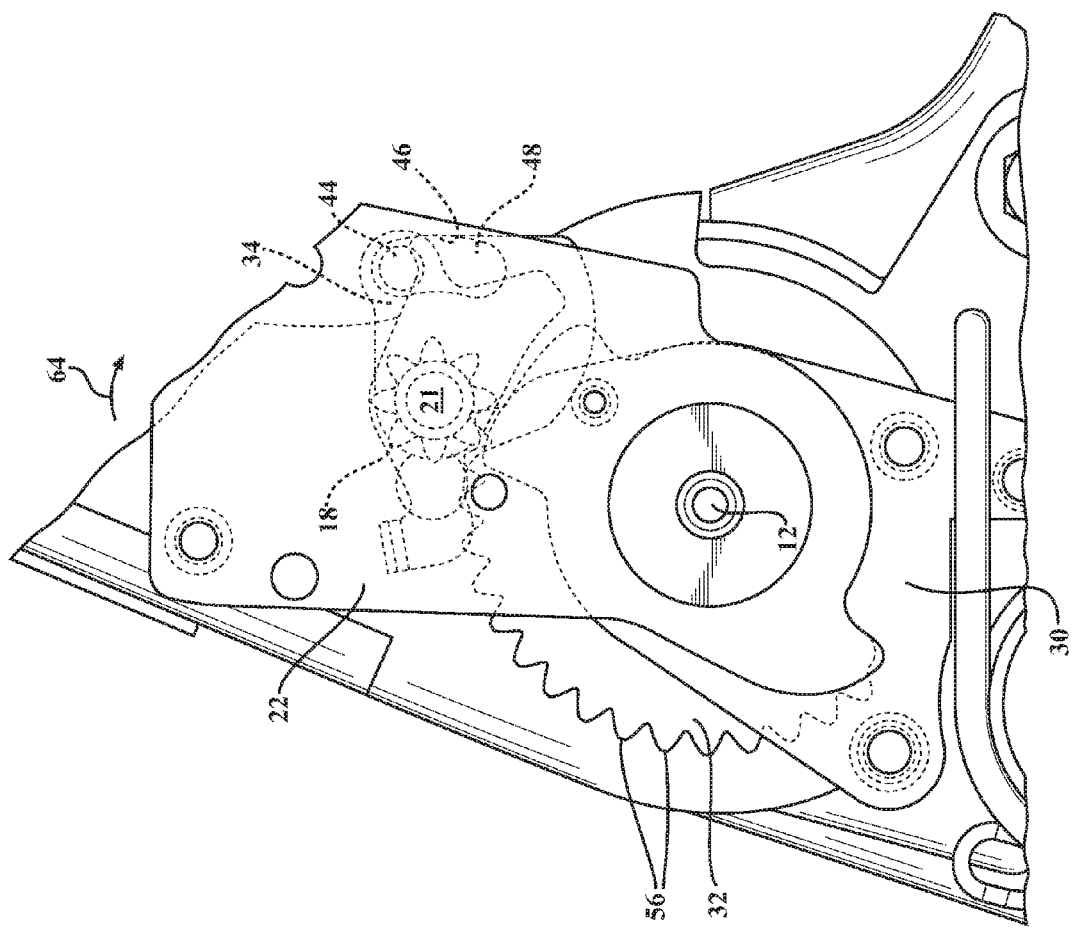
FIG. 5 succeeds FIG. 4 and illustrates the clock spring associated with the central pivot of the seatback sector influencing the seatback in a forward rotating dump direction.
Figure 6:
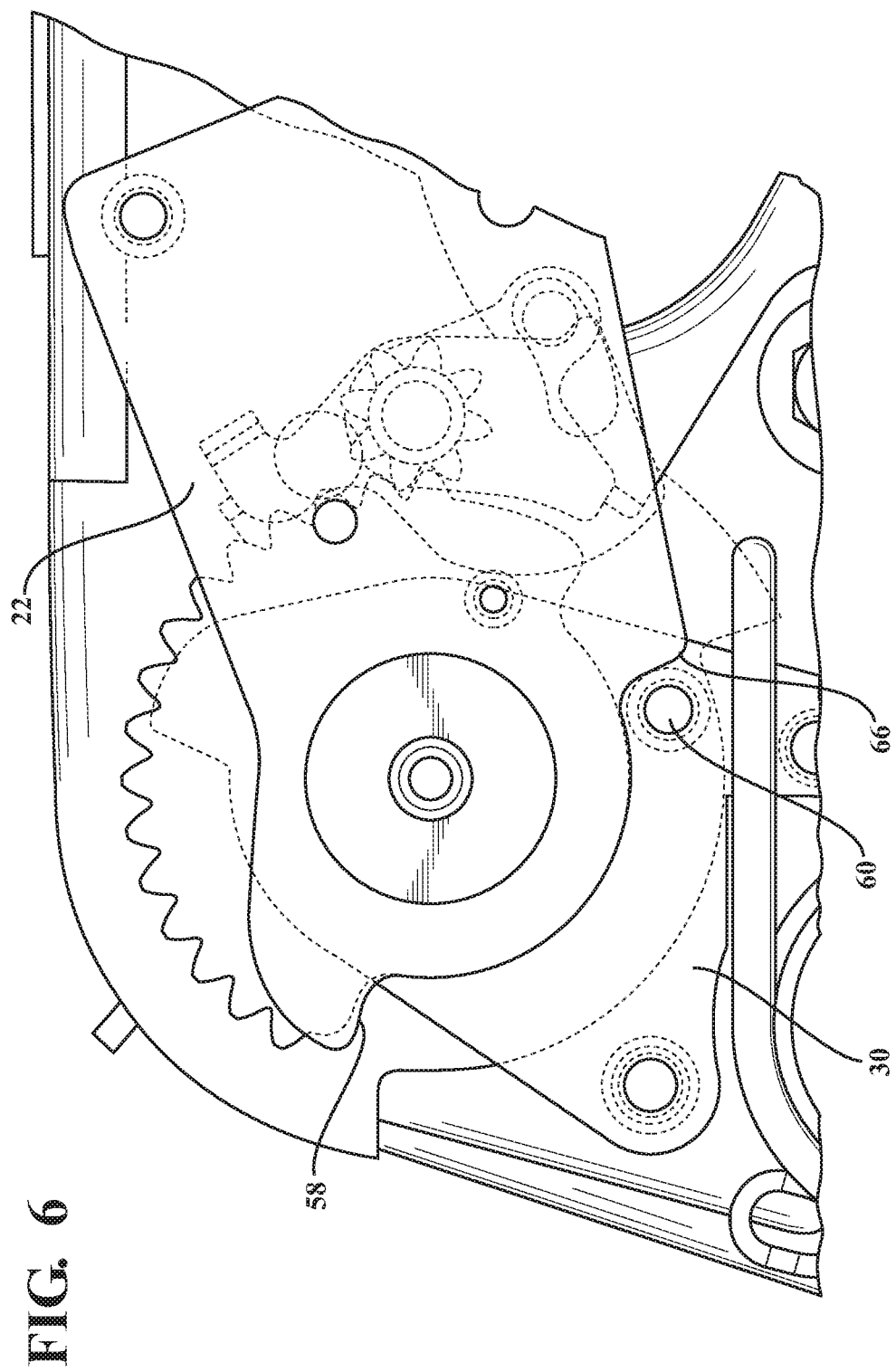
FIG. 6 is depicts the conclusion of the forward rotation of the seatback sector in FIG. 5 to the forward dump location, at which a second outer sandwiching and pivotal sector slaved to the seatback mounting sector plate, exhibits a configured exterior location which abuts a pin affixed to an exposed surface location of the fixed sector plate.

FIG. 5 succeeds FIG. 4 and illustrates the clock spring 14 (FIG. 1) associated with the central pivot (such as shown at 12 in FIG. 1 as referenced to both of collinear assembly and free pivot locations) of the seatback assembly influencing the seatback in a forward rotating dump direction, and as referenced by directional arrow 64 referencing the ongoing forward pivoting rotation of the seatback. FIG. 6 depicts the conclusion of the forward rotation of the seatback sectors 20/22 in FIG. 5 to the forward dump location and at which a further abutment edge 66 on the lower sector 22 engages the pin 60 of the fixed sector 30.

Figure 7:
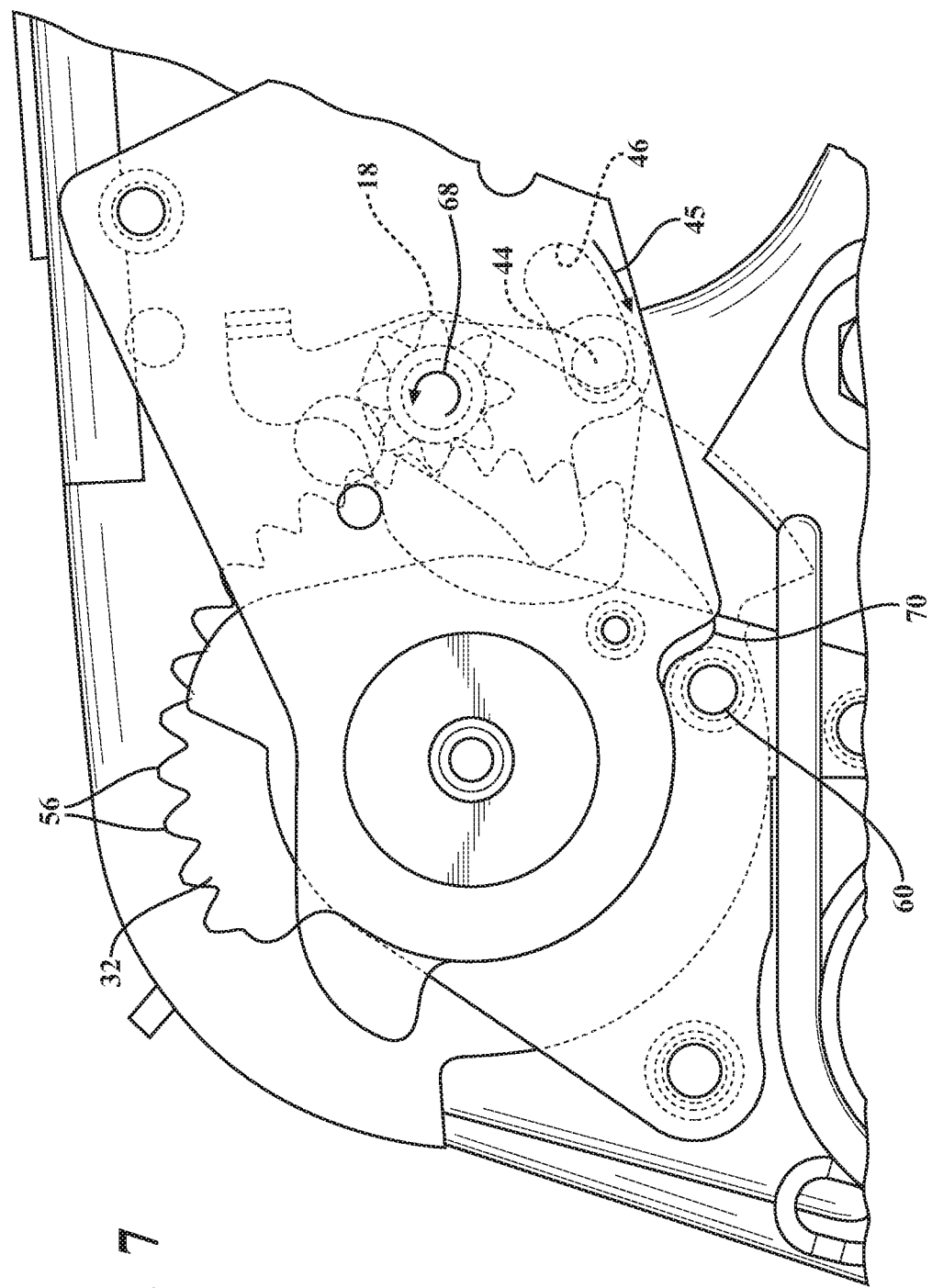
FIGS. 7-9 succeed FIG. 6 and illustrate the cam mounting pinion drive gear being actuated in a counterclockwise rewind direction in order upwardly retract the seatback sector to the return design position, by winding about a second exteriorly toothed sector plate which is held into abutting contact with the fixed sector plate pin and concluding with the cam reseating with the fixed sector in the upright design position.
Figure 8:
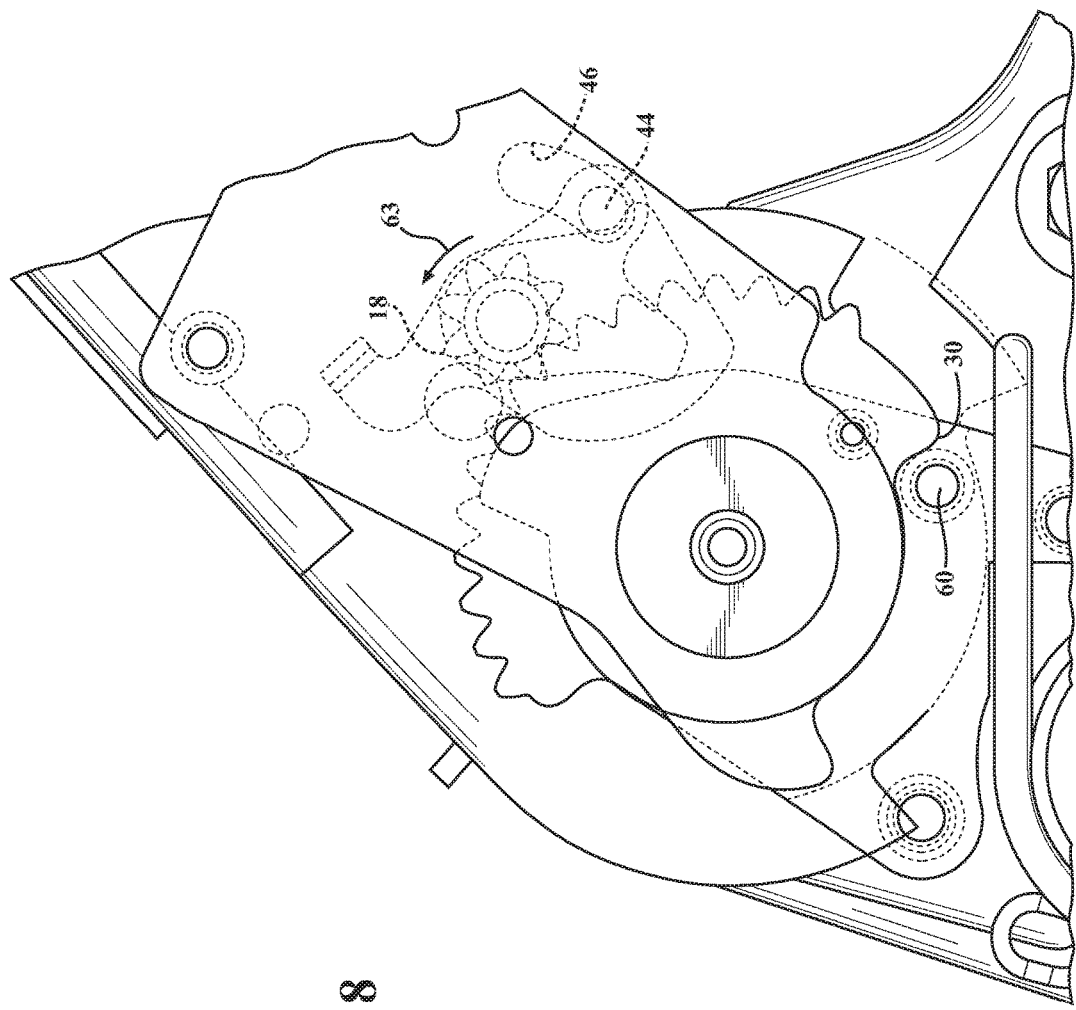
Figure 9:
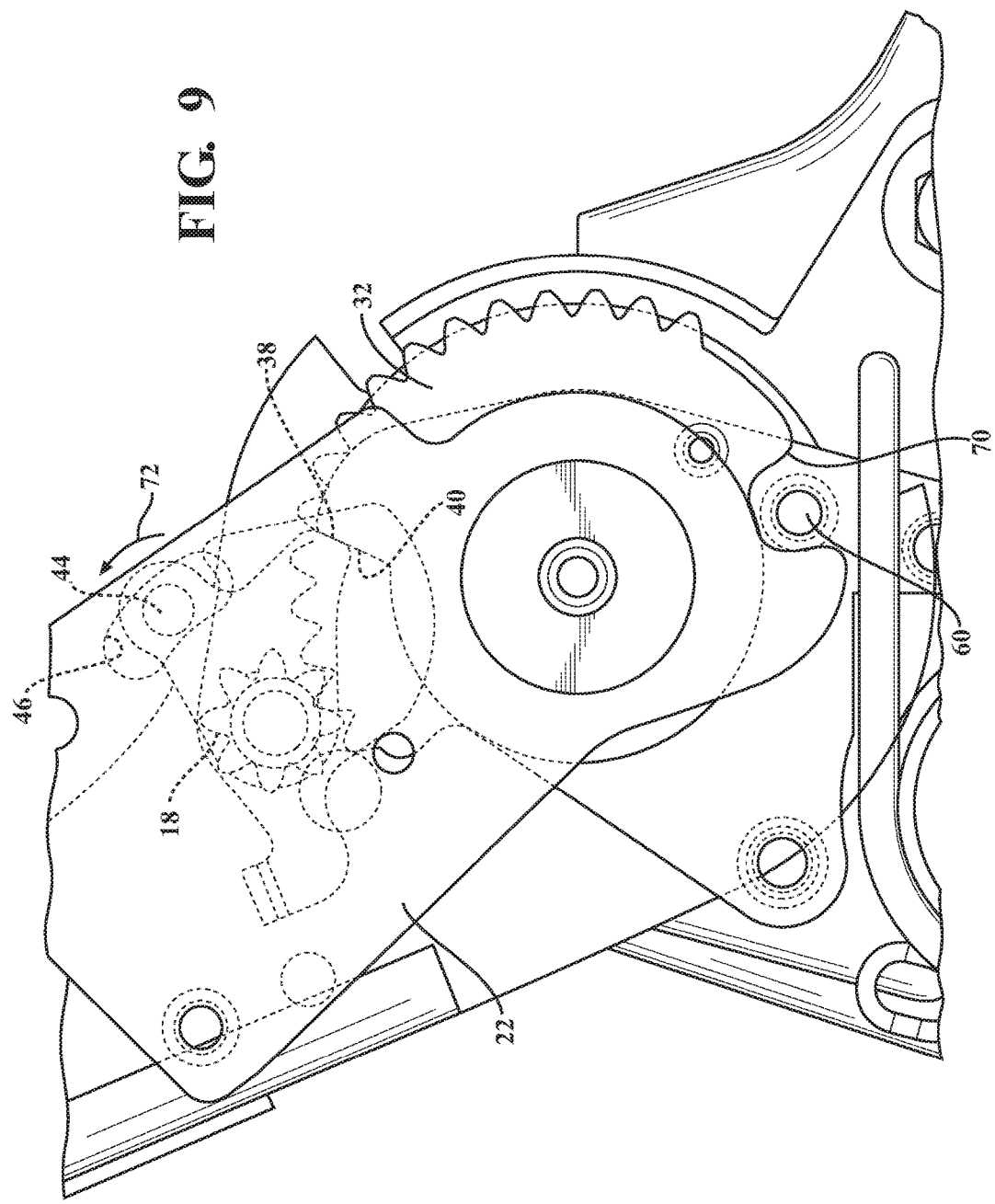

FIGS. 7-9 succeed FIG. 6 and illustrate the cam mounting pinion drive gear 18 being actuated in a counterclockwise rewind direction, see arrow 68, in order upwardly retract the seatback sectors 20/22 to the return design position (original FIG. 3), this accomplished by winding about the exteriorly toothed sector plate 32 which is held into abutting contact with the fixed sector 30 plate pin 60, and concluding with the cam 34 reseating with the fixed sector 30 in the upright design position (see reseating of abutment surface 38 of cam 34 with opposing surface 40 of sector 30). At this point, the pin 44 of the cam 34 travels within the slot 46 of the sandwiched sector 22 (arrow 45) in order to permit the cam edge 38 to drop back into engagement with the fixed sector edge 40.

Figure 10:
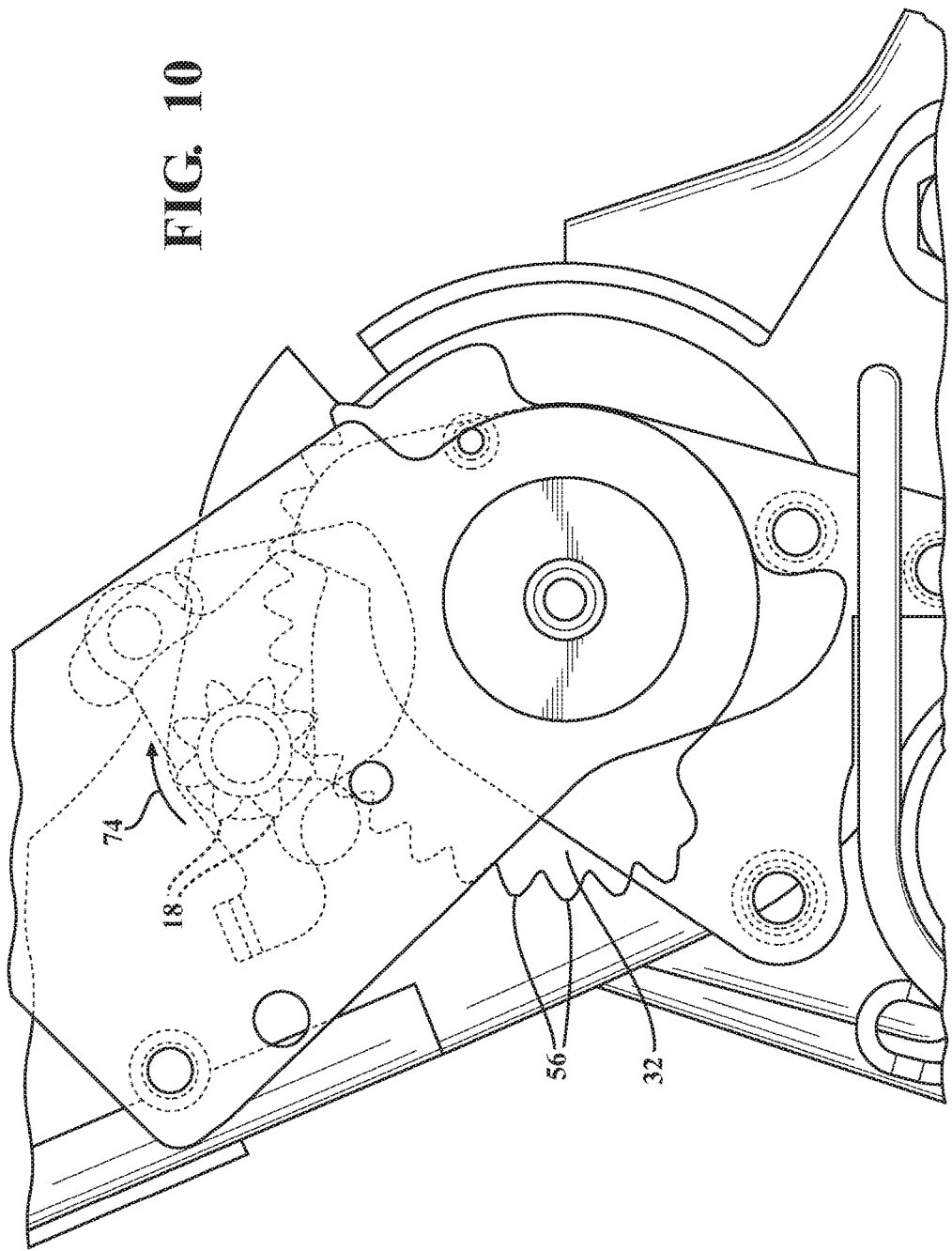
FIGS. 10-11 illustrate the cam pinion drive gear rotated in a reversed clockwise direction in order to rotate the toothed sector plate to a reset position corresponding to the initial upright design position of FIG. 3.
Figure 11:
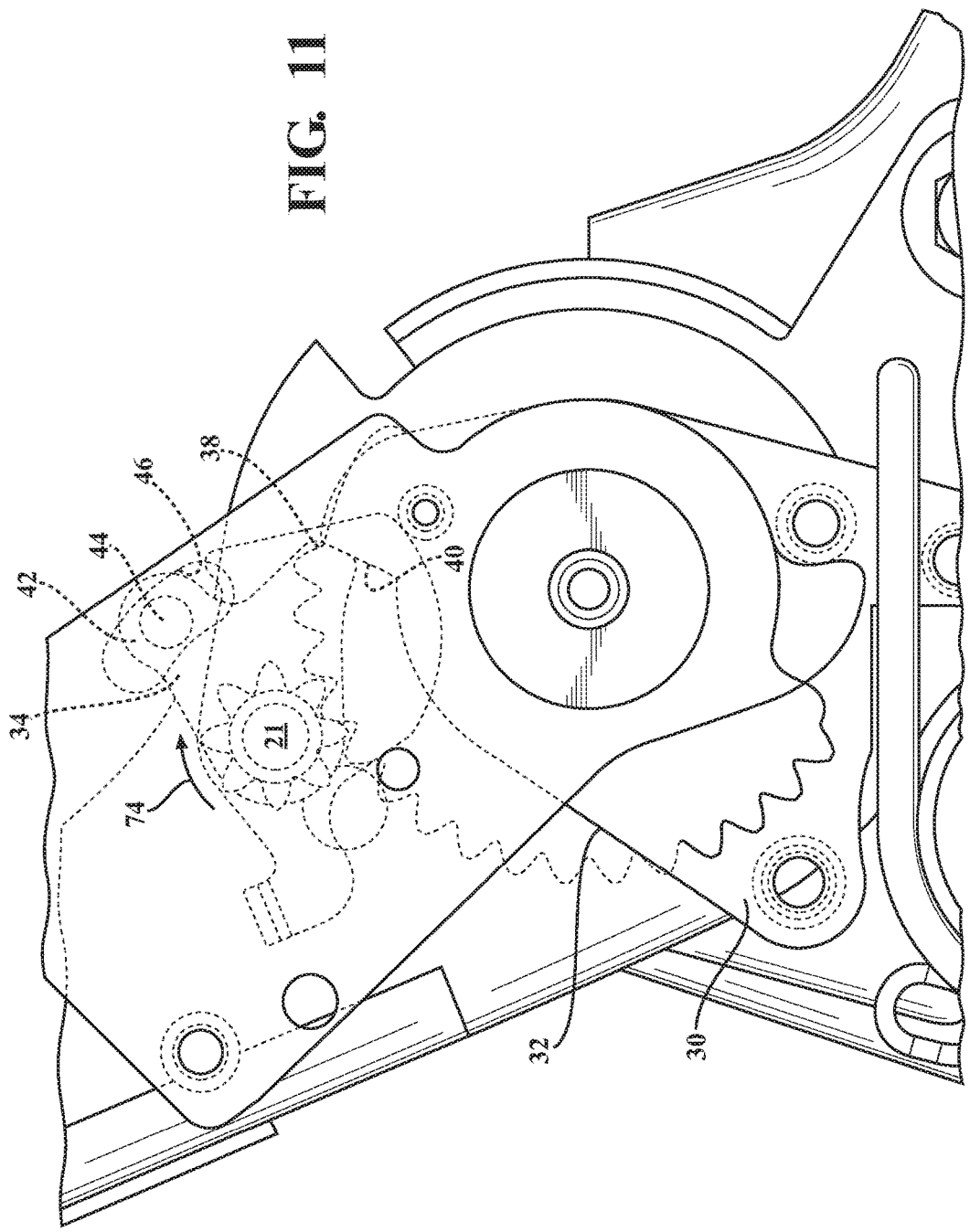

Proceeding to FIGS. 10-11, a pair of illustrations are provided of the cam pinion drive gear 18 rotated in a reversed clockwise direction, see arrow 74, in order to rotate the toothed sector 32 plate to a reset position corresponding to the initial upright design position of FIG. 3, this accomplished by the teeth 18 of the pinion drive gear engaging the opposing outwardly arrayed teeth 56 of the reset plate 32 in a ccw direction, concluding in FIG. 11 with the plate 32 corresponding to the original position of FIG. 3. At this point, the rear row seatback has been reset to its original upright position.

Referencing now FIGS. 12-18 a corresponding set of plan view illustrations are shown of a related variant of a rear row seatback manual dump and power rewind/reset assembly. For purposes of clarity of illustration, a number of repetitive and identically configured elements are not repeated, with attention instead being given to the revised features of the variant.

Figure 12:
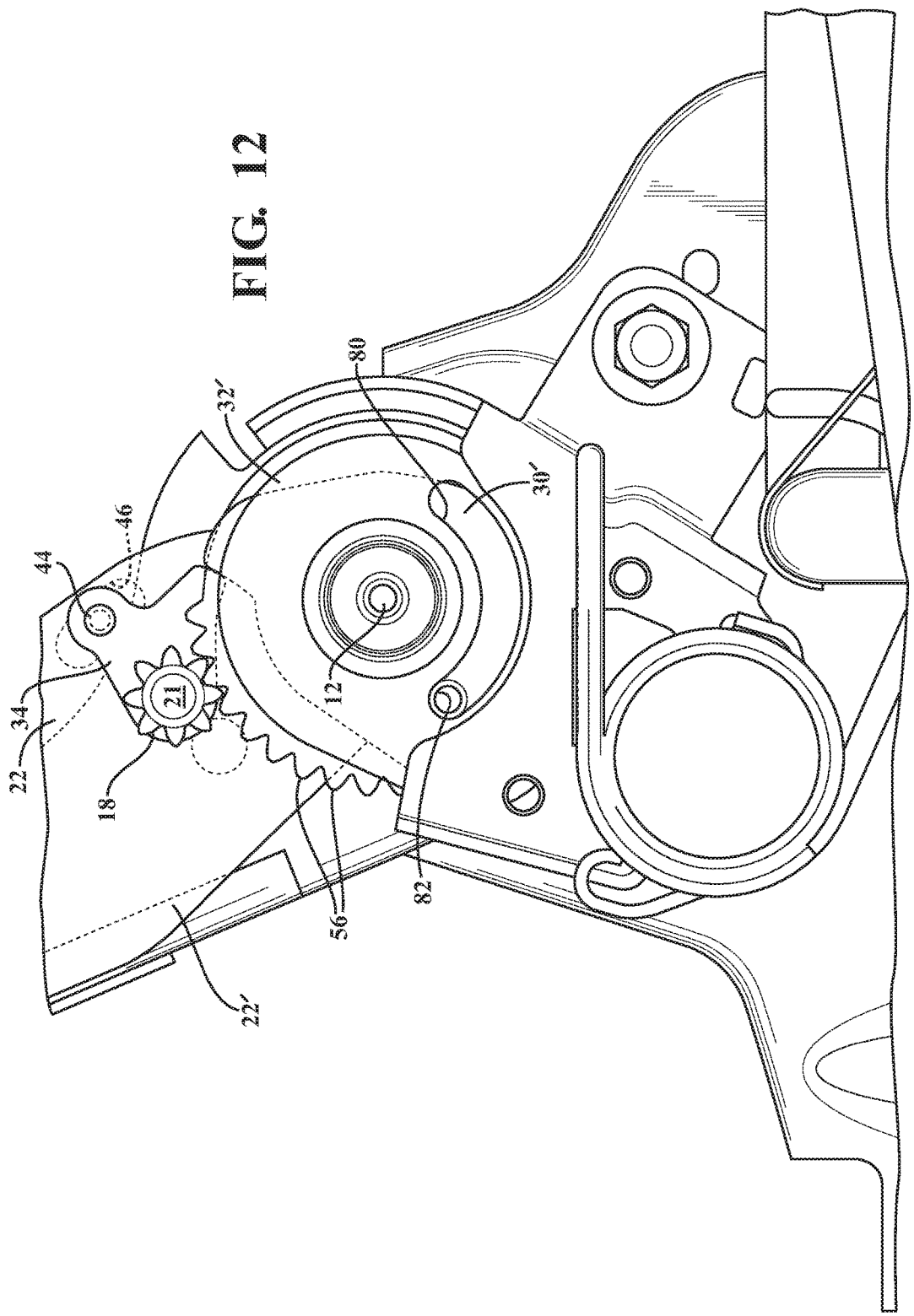
FIG. 12 is a side plan illustration of an initial upright design position associated with the seatback assembly according to a second embodiment in which both the exterior toothed and rotatable sector as well as the outer pivotal and sandwiching seatback sector are reconfigured from that shown in FIGS. 3-11.

Referring first to FIG. 12, a side plan illustration is shown of an initial upright design position associated with the seatback assembly according to a second embodiment in which both the exterior toothed and rotatable sector is redesigned as depicted at 32', along with the outer pivotal and sandwiching seatback sector 22' being reconfigured from that shown in FIGS. 3-11. In particular, an arcuate slot 80 is configured within the toothed sector 32' and seats a repositioned pin 82 of a reconfigured fixed sector 30'.

Figure 13:
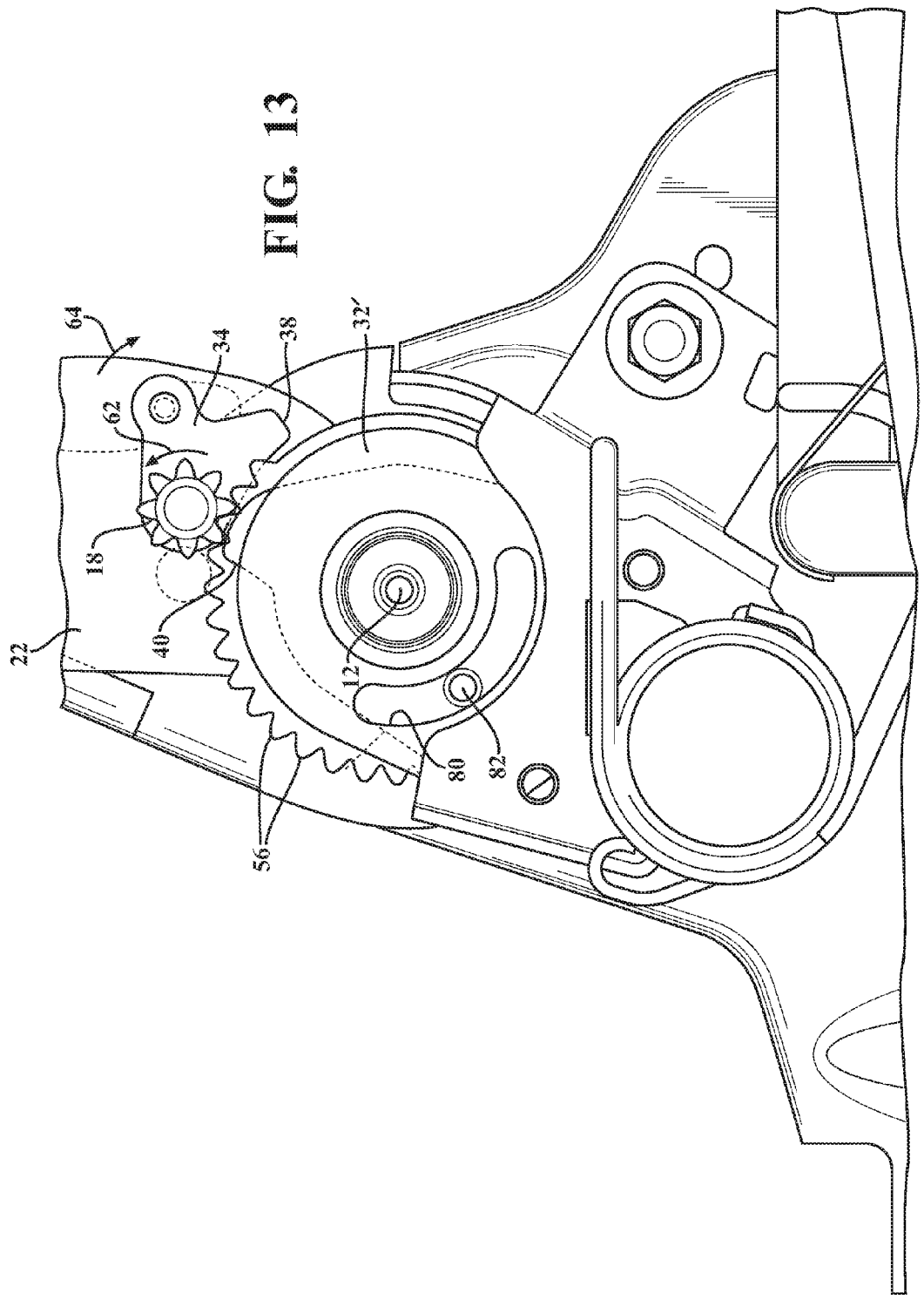
FIG. 13 is a succeeding illustration to FIG. 12 (similar in protocol to that depicted in FIG. 4 for the first embodiment) and showing the seatback sector pivotally supported cam initially rotated (either by a lever to cable arrangement engaged to an offset pivot location of the cam or by driving the pinion gear in a brief counterclockwise direction) so that an abutting edge thereof unseats from a shoulder of a fixed sector plate and the seatback is permitted to begin rotating, such as under a clock spring bias, to the forward rotated/dump position, a reposition pin in the fixed sector plate seating within an arcuate channel defined in the toothed sector plate and guiding rotation of the plate.

FIG. 13 is a succeeding illustration to FIG. 12 (similar in protocol to that depicted in FIG. 4 for the first embodiment) and showing the seatback sector 20/22 pivotally supported cam 34 initially rotated (either by a lever to cable arrangement engaged to an offset pivot location of the cam or by driving the pinion gear in a brief counterclockwise direction as previously described) so that an abutting edge thereof unseats from a shoulder of a fixed sector plate and the seatback is permitted to begin rotating, such as under a clock spring bias, to the forward rotated/dump position, with the repositioned pin 82 extending from the fixed sector plate 30' seating within the arcuate channel 80 defined in the toothed sector plate and guiding rotation of the plate 32' (either in slaved fashion along with the pivoting seatback sectors 20/22 or in individually resetting (ccw rotating) fashion.

Figure 14:
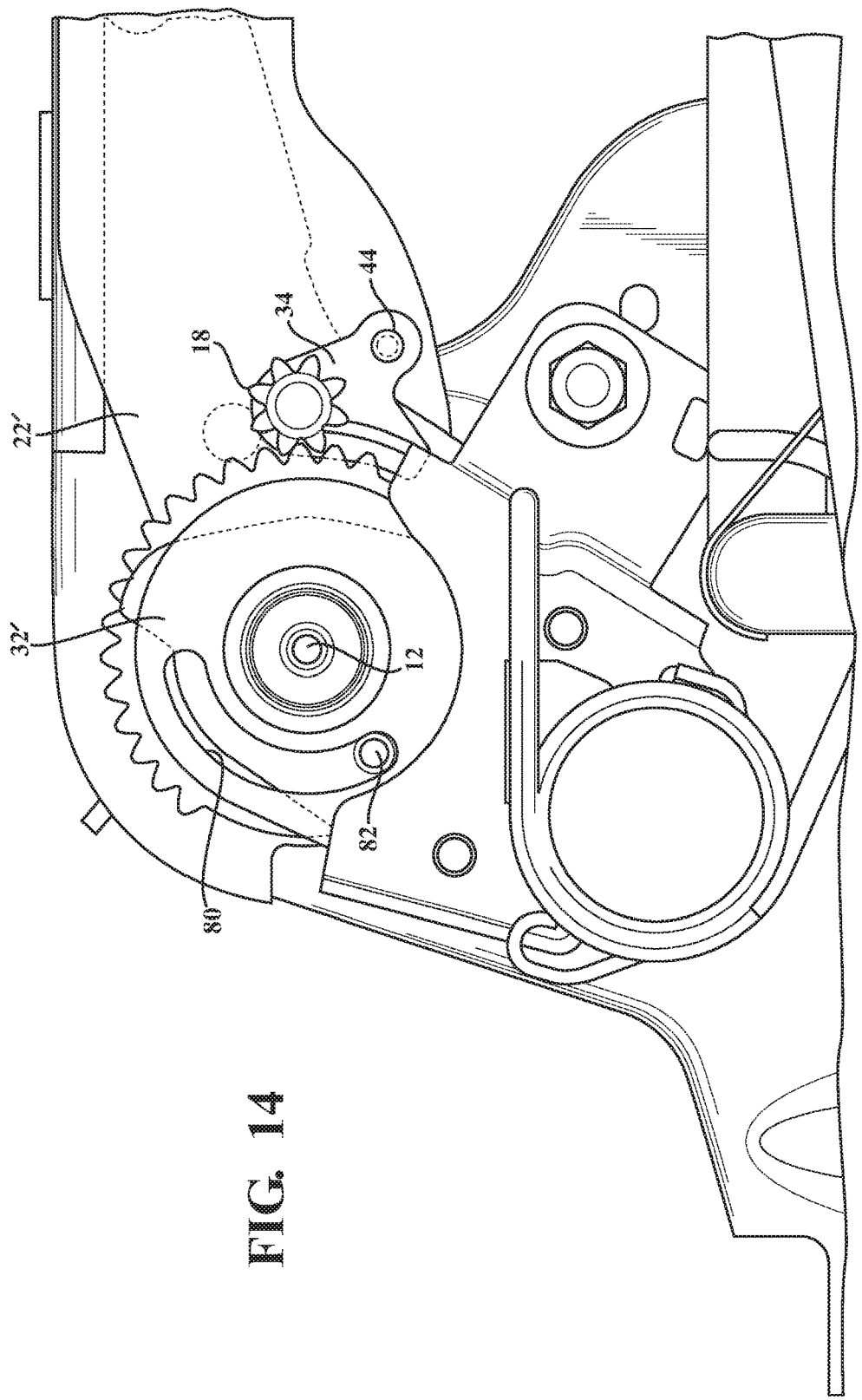
FIG. 14 succeeds FIG. 13 and illustrates the conclusion of the forward rotation of the seatback sector to the forward dump location.
Figure 15:
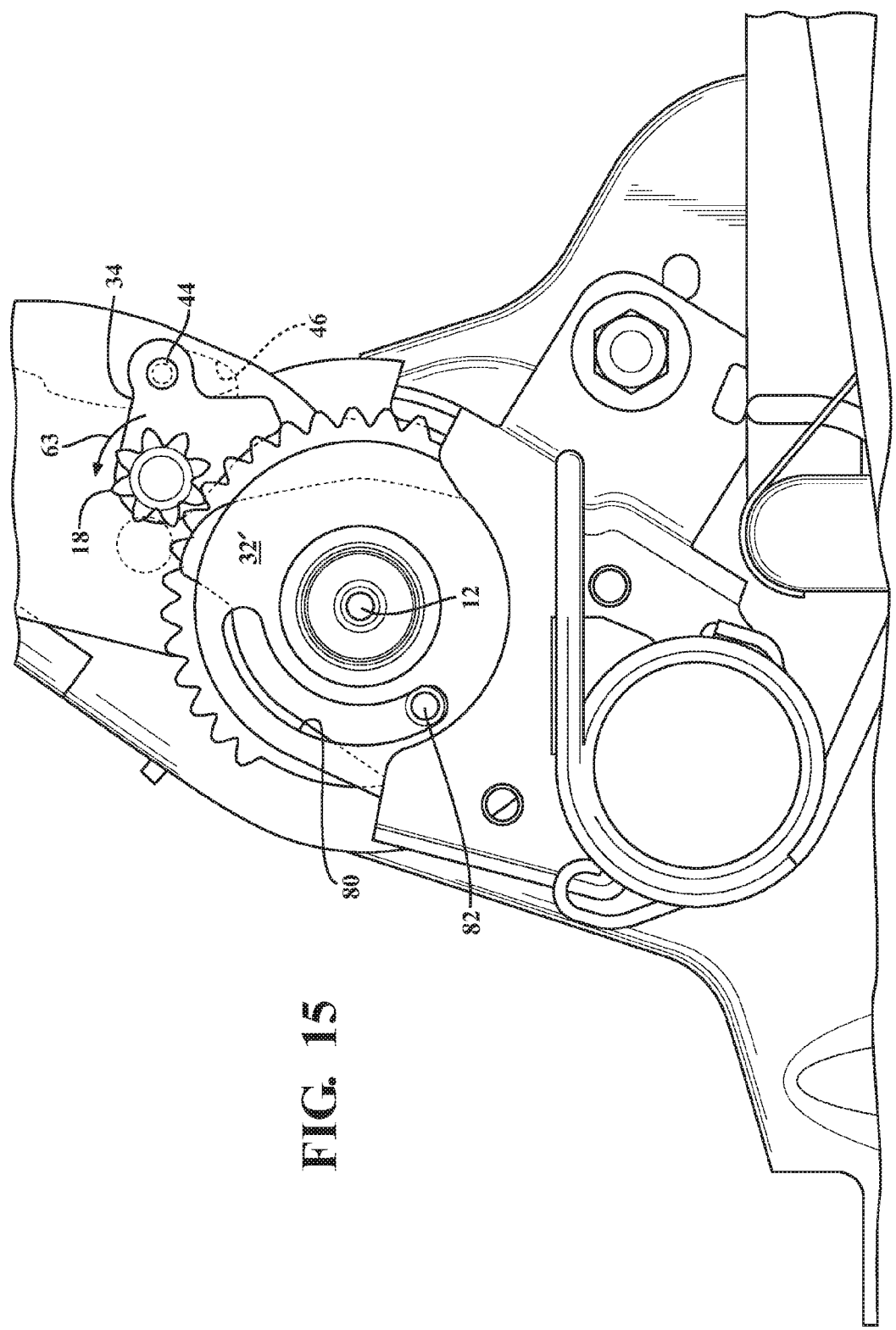
FIGS. 15-16 succeed FIG. 14 and illustrate the cam mounting pinion drive gear being actuated in a counterclockwise rewind direction in order upwardly retract the seatback sector to the return design position, by winding about a second exteriorly toothed sector plate which is held into abutting contact with the fixed sector plate pin and concluding with the cam reseating with the fixed sector in the upright design position.
Figure 16:
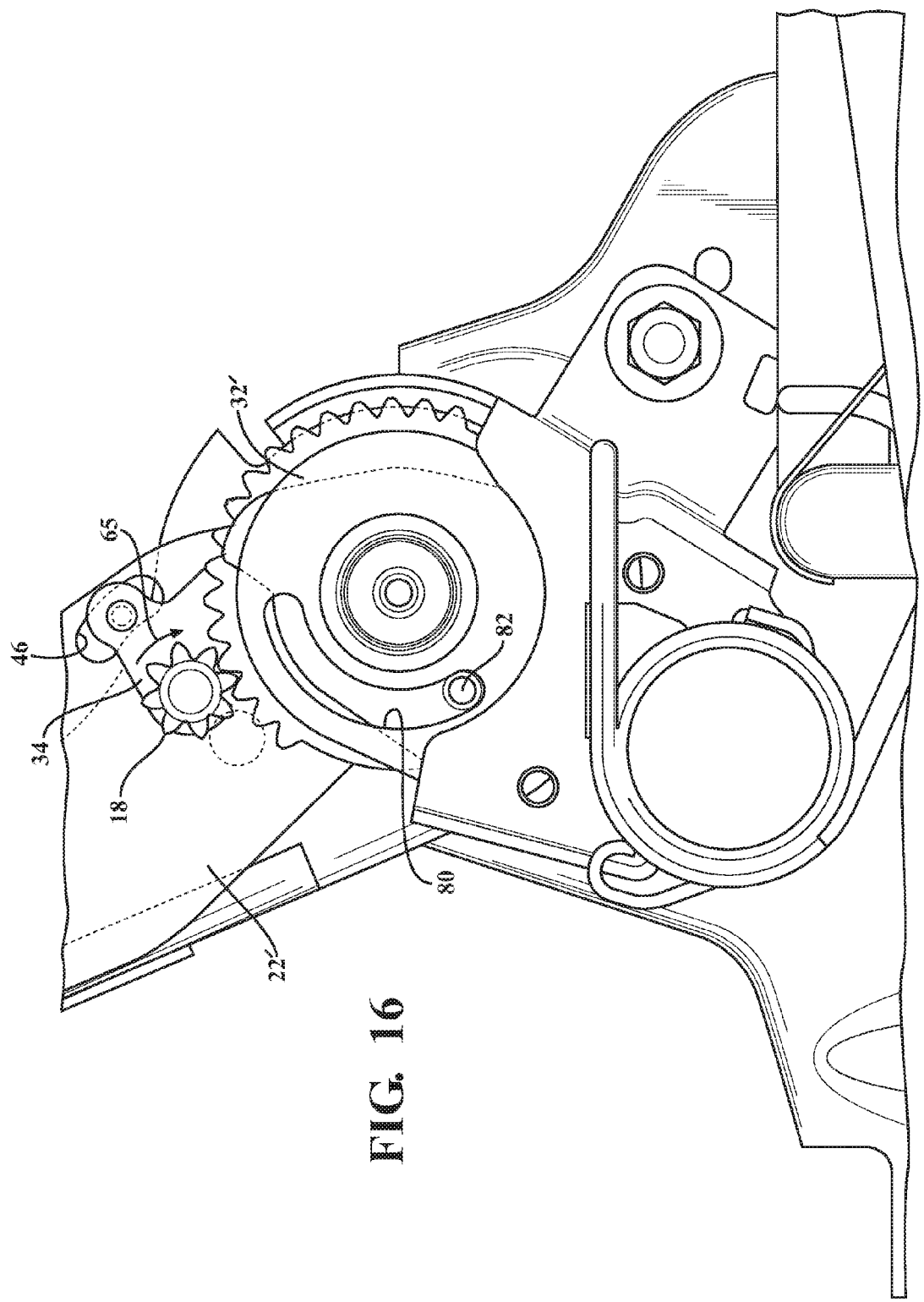

FIG. 14 succeeds FIG. 13 and illustrates the conclusion of the forward rotation of the seatback sector to the forward dump location (see also directional arrows 62 and 64 repeated in FIG. 13). FIGS. 15-16 succeed FIG. 14 and illustrate the cam mounting pinion drive gear 18 being actuated in a counterclockwise rewind direction (see also FIG. 8) in order upwardly retract the seatback sector 20/22 to the return design position, this again by winding about the second exteriorly toothed sector plate 32' which is held into abutting contact with the fixed sector plate pin 82 and concluding with the cam 34 reseating its abutting surface 38 with the opposing surface 40 of the fixed sector 30' in the upright design position (see arrow 65).

Figure 17:
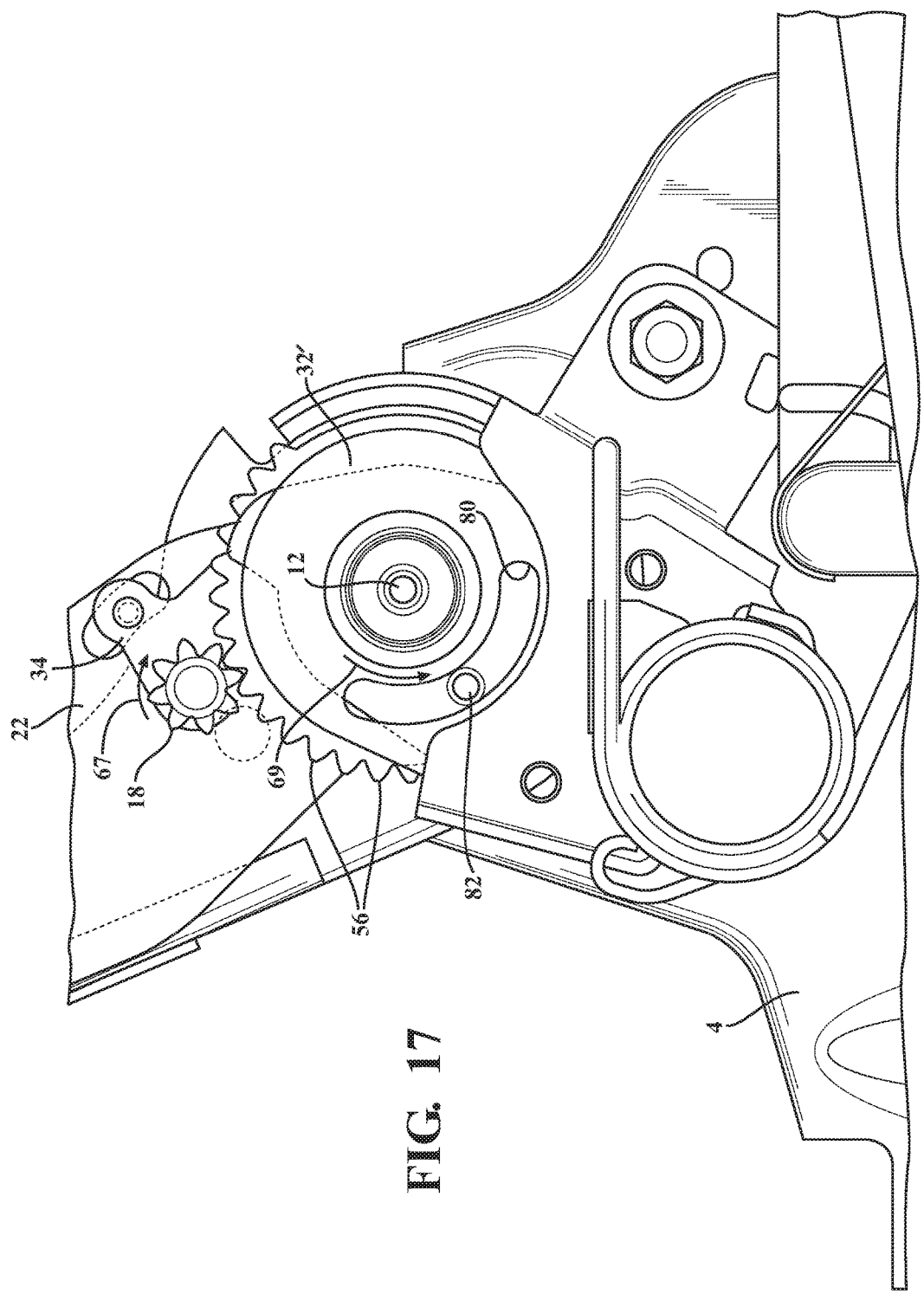
FIGS. 17-18 illustrate the cam pinion drive gear rotated in a reversed clockwise direction in order to rotate the toothed sector plate to a reset position corresponding to the initial upright design position of FIG. 12.
Figure 18:
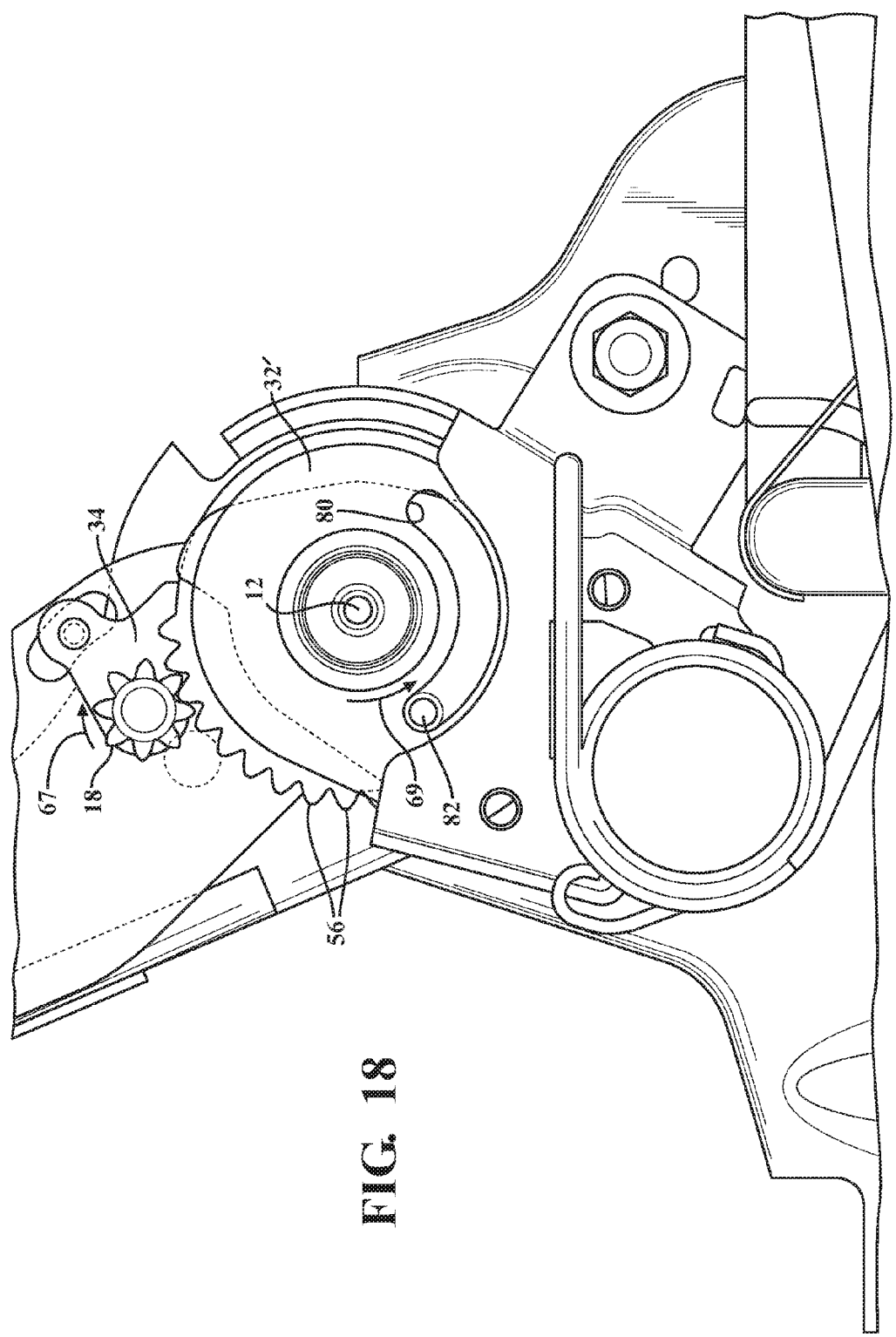

FIGS. 17-18 likewise correspond to the rewind views of FIGS. 10-11 in the preceding embodiment and illustrate the cam pinion drive gear 18 rotated in a reversed clockwise direction 67 in order to rotate the toothed sector plate (arrow 69) to a reset position corresponding to the initial upright design position of FIG. 12. At this point, the seat assembly as been reset and can be subsequently retriggered to the forward dump condition by either of the actuating of the lever 48 (see again FIG. 3) via the cable (again pivoting abutment edge 50 against the channel supported lift pin 44 of the cam 34) or by rotating the pinion drive gear 18 on the ccw direction a given number of rotational cycles in order to lift the cam 38 out of engaged contact with the fixed seating edge 40 of the sector 30.

Figure 19:
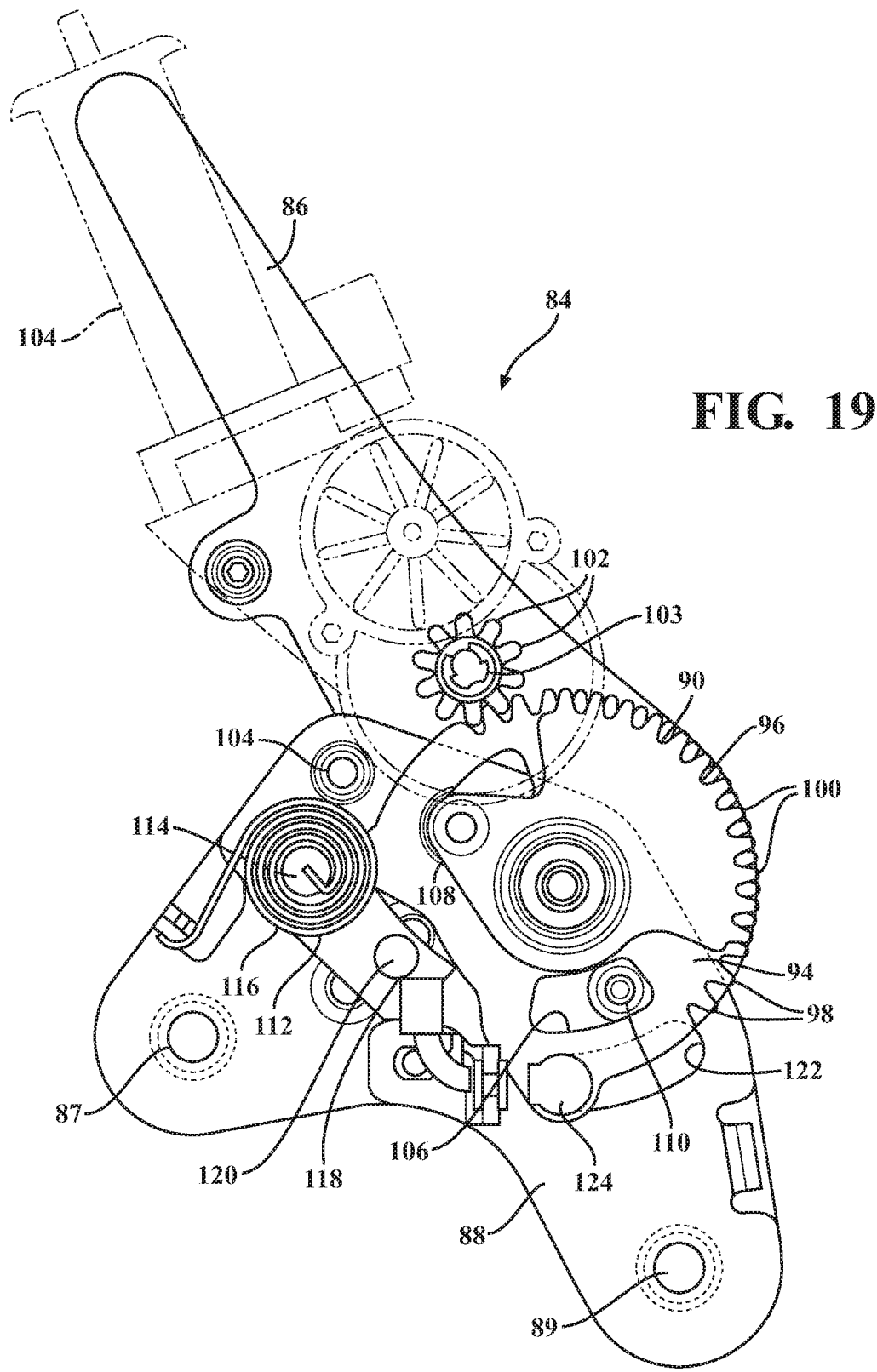
FIG. 19 a side plan illustration of an initial upright design position associated with the seatback assembly according to a third embodiment exhibiting a redesigned cam along with both fixed and rotatable toothed sectors.

Proceeding to FIG. 19, a side plan illustration is shown at 84 of an initial upright design position associated with the seatback assembly according to a third embodiment. Similar to the preceding embodiments, the seatback assembly 84 can be configured to provide either or both of powered or spring loaded seatback dump, combined with power (e.g. motor pinion gear initiated) rewind. As will be further explained, it is also envisioned that the motor can provide both powered up and down operation utilized the presently disclosed structure.

The plan views of FIGS. 19-23 each illustrate seatback arm or sector 86 pivotally supported relative to a pair of spaced apart inner and outer floor support stanchions (an outer spaced stanchion being shown substantially transparent fashion at 88, with both inner and outer spaced supporting stanchions mounted via engagement rivets 87 and 89 and containing a package arrangement of the seatback sector and related components).

A main pivot 90 supports the pivoting motion of the seatback sector 86 relative to the floor supported stanchions. Although not shown, a main clock spring can be provided for facilitating forward dump of the seatback sector separate from a power down motion initiated by the motor pinion drive.

A pair of exteriorly toothed sectors are provided and include each of a rotatable sector 94 and an overlapping fixed sector 96, these stacked upon the lower pivotally supported portion of the seatback sector 86. The sectors 94 and 96 each include an outer array of teeth (at 98 and 100, respectively) which are substantially overlapping in order to receive pinion gears 102 of a drive motor 104. As further shown, the exteriorly and arcuately arrayed teeth associated with the rotatable 94 and fixed 96 sectors are substantially in alignment so that the engaging pinion gear gear 102 winds across the guiding surface of the sectors as subsequently described. The pinion gear 102 further includes a bushing 103 similar as described in the preceding embodiments, this accommodating minor misalignments between the pinion teeth and the sets of the teeth 98 and 100.

As further shown, the rotatable sector 96 includes a pair of circumferentially offset and extending slots, see inner closed rims at 104 and 106, through which project a pair of pins 108 and 110 for defining a limited rotational range associated with the toothed sector 96. A cam 112 is provided and which is pivotally mounted at a pivot point 114 to a rear location of the fixed floor sectors, a clock spring 116 provided for influencing the cam 112 in a (counter clockwise) engaging direction against the rotatable toothed sector 94. Although not clearly shown, the rotatable sector 94 includes a contact shoulder (see phantom location at 118 in FIG. 19) which is in abutting engagement with a pin 120 extending from the cam 112 at an offset location from the main pivot 114.

A further actuate slot is configured in the outer seat bottom supporting sector, again at 88, and is illustrated by inner perimeter extending rim 122. A further guide pin or projection 124 extends outwardly from a bottom end location of the rotatable toothed sector 94, such in combination with the circumferentially offset slots defining a range of rotation of the sector 94 for triggering release of the seatback arm 86.

Figure 20:
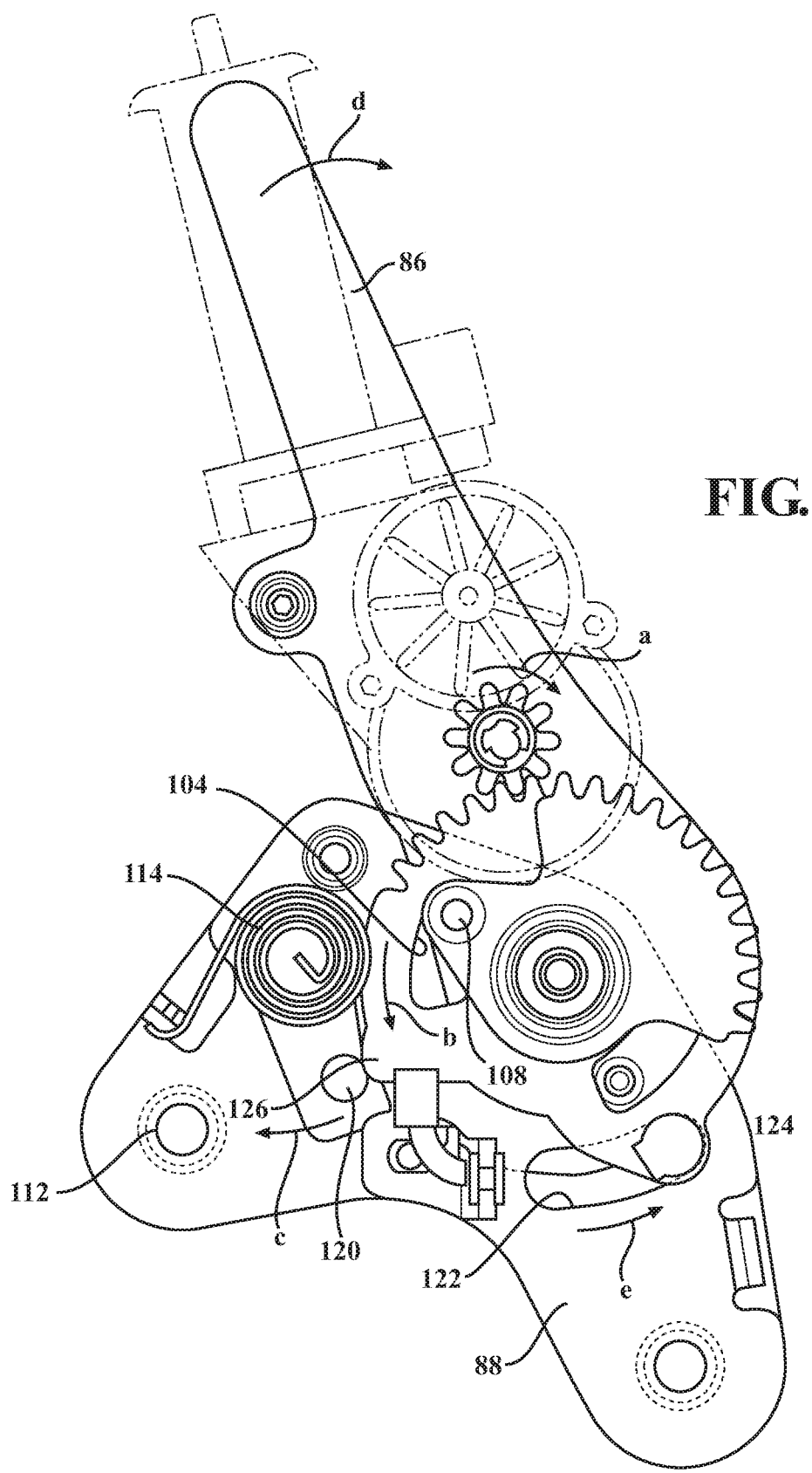
FIG. 20 is a succeeding view to FIG. 19 and illustrating an exteriorly toothed and rotatable sector which is rotated in a counter clockwise direction by a clockwise induced rotation of the pinion gear, an edge abutment of the rotatable sector displacing in a clockwise pivoting fashion a spring loaded cam having a pin influenced to unseat from a contact shoulder associated with the rotatable seatback sector, such permitting thereafter pivoting in a forward dump direction.

FIG. 20 is a succeeding view to FIG. 19 and illustrating the exteriorly toothed and rotatable sector 94 which is rotated in a counter clockwise direction, see directional arrow (b), by An initial clockwise induced rotation of the pinion gear, see at direction arrow (a). An edge abutment 126 of the rotatable sector (such substantially hidden underneath the cam clock spring 114 in FIG. 19) being rotated into contact with the cam pin 120 for displacing the same in a clockwise pivoting fashion, directional arrow (c).

The spring loaded cam 112 as previously described having the pin 120 and, upon contact and rotation as shown by arrow (c), being influenced to unseat from the contact shoulder 118 (again FIG. 19) associated with the rotatable seatback sector 94, such permitting thereafter pivoting in a forward dump direction of the seatback arm 86, see directional arrow (d), again either through the influence of a main clock spring (not shown) associated with the main pivot 90 or through the driving (power down) motion of the seatback arm 86 via the motor 104. As further shown in FIG. 20, the rotatable sector pin 124 travels along the slot 122 as depicted by further directional arrow (e) consistent with the travel of fixed pins 108 and 110 within the slots 104 and 106 until the spring loaded cam 112 and contact pin 120 unseats from the contact shoulder 118 to permit the seatback arm to be released.

Figure 21:
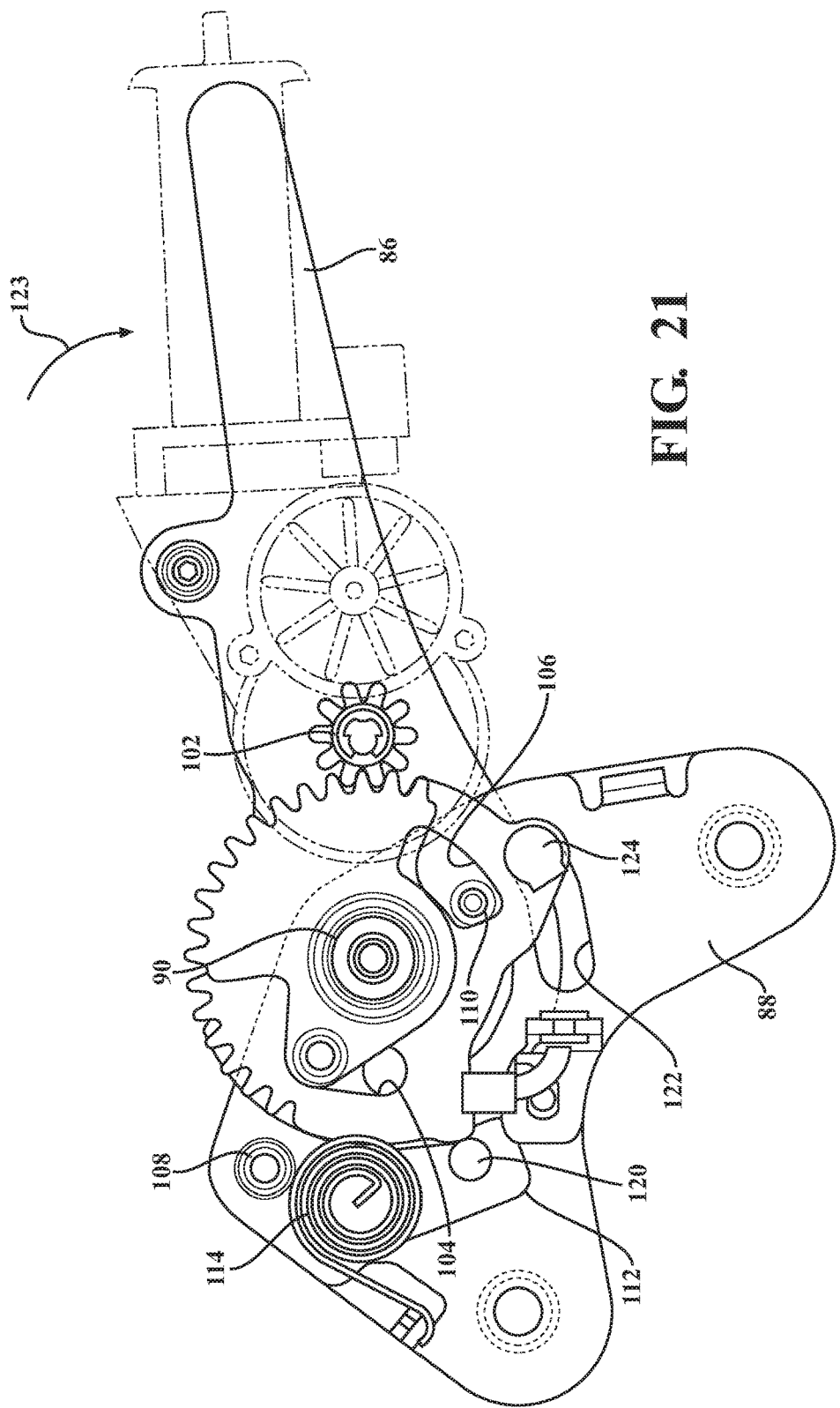
FIG. 21 is an illustration of the seatback in a forward dump direction, such occurring in either of a power down (motor activated pinion gear driving) fashion or additionally/alternatively capable of occurring in combination with a free-wheeling (disengaged) rotation of the pinion drive gear in combination with the influencing force of a main clock spring.
Figure 22:
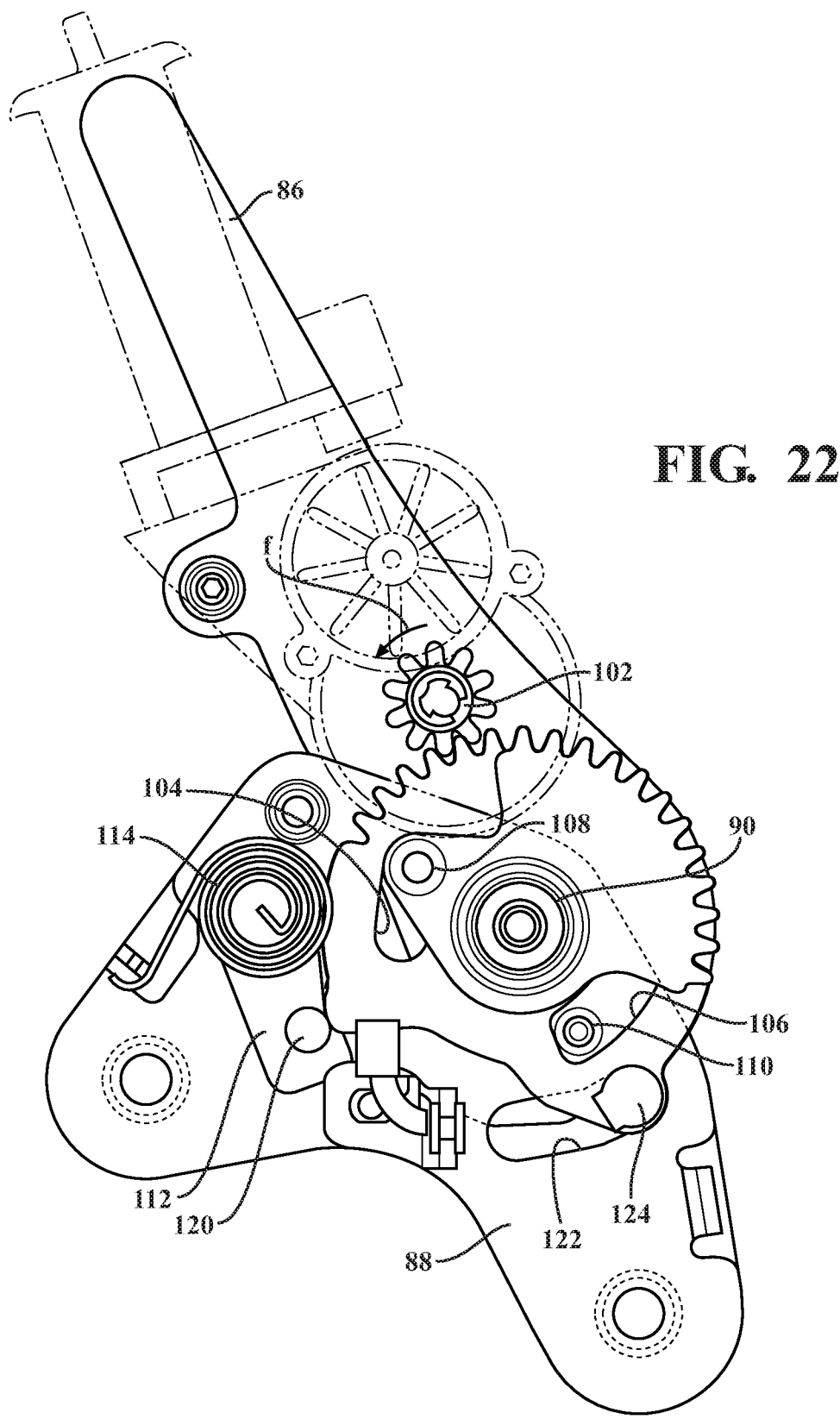
FIG. 22 illustrates a reverse and upward rewinding of the pinion drive gear for driving the seatback upward to the design position.
Figure 23:
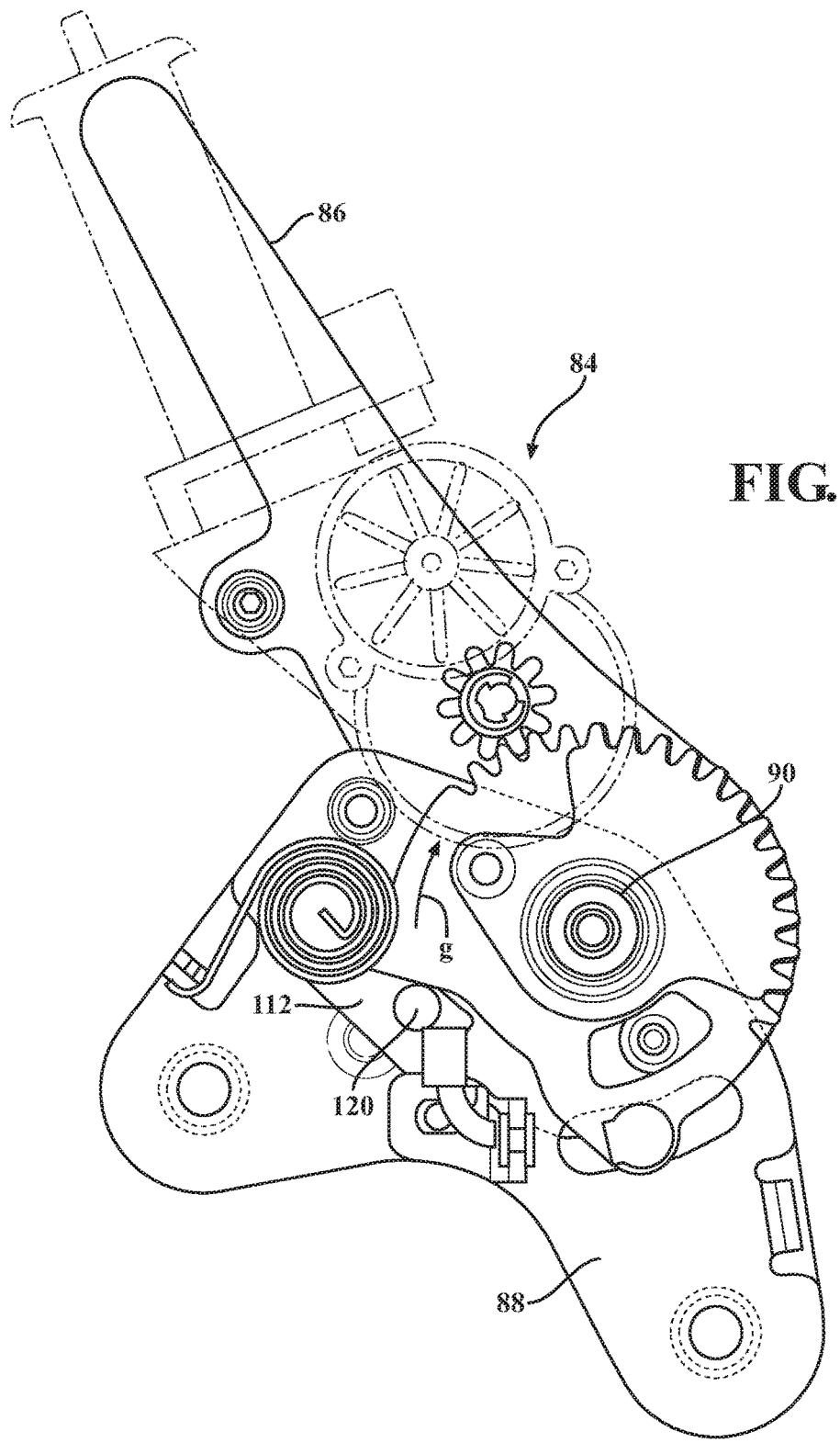
FIG. 23 illustrates a reset to the position of FIG. 19 resulting from reverse clockwise rotation of the exteriorly toothed rotatable sector, causing the spring loaded cam and its pin to reseat into engagement with the seatback contact shoulder.

FIG. 21 is an illustration of the seatback arm 86 in a forward dump/power down direction (arrow 123), such again occurring in either of a power down (motor activated pinion gear driving) fashion or additionally/alternatively capable of occurring in combination with a free-wheeling (disengaged) rotation of the pinion drive gear in combination with the influencing force of a main clock spring. FIG. 22 illustrates a reverse and upward rewinding of the pinion drive gear 102, see rotary directional arrow (f), for driving the seatback 86 upward to the design position. Finally, FIG. 23 illustrates a reset to the position of FIG. 19, resulting from reverse clockwise rotation of the exteriorly toothed rotatable sector 94, as shown by directional arrow (g), thereby causing the spring loaded cam 112 and its pin 120 to reseat into engagement with the seatback contact shoulder.

It is understood that the construction of the seat assembly is further such that the linkages described herein can be actuated in alternate variants in a fully manual embodiment (without the drive motor and pinion gear). To this end, it is also envisioned that the forward dump, upright return and reset steps can also be practiced with or without the motor structure present, such including manual manipulation as can be assisted by the bushing 21 integrated into the pinion gear 18 which can permit forced manual rotation. In other variants, it is also envisioned that the motor can be replaced by a manually actuated gear or other actuating mechanism.

Having described my invention, other and additional preferred embodiments will become apparent to those skilled in the art to which it pertains and without deviating from the scope of the appended claims.

I claim:

1. A seatback assembly pivotally supported upon a seat bottom, said assembly including each of forward spring assisted dump, rewind, and reset protocols and comprising:
   a stationary sector affixed to said seat bottom and having an abutment edge;
   a pivoting seatback sector pivotally secured to said stationary sector and influenced in a forward rotating dump direction;
   a cam rotatably supported upon said pivoting seatback sector, said cam having an outer engaging edge in abutting contact with said abutment edge for maintaining said seatback sector in an upright design position;
   a rotating sector plate arranged in stacked fashion with said stationary and pivoting seatback sectors, said sector plate exhibiting a plurality of outer circumferentially arrayed teeth;
   a pinion gear extending from a pivot axis established between said cam and seatback sector, said gear engaging said outer arrayed teeth of said sector plate; and
   upon said cam being rotated out of engagement with said stationary sector, said seatback rotating to a forward dump position, subsequent rotation of said pinion gear rotatably displacing said sector plate and said seatback in slaved fashion to retract said seatback to the upright design position, with a concluding and counter-rotation of said pinion gear counter-rotating and resetting said sector plate independently of said seatback sector to a final reset position.

2. The seatback assembly as described in claim 1, further comprising said pinion drive extending from an electric motor mounted to said pivoting seatback sector.

3. The seatback assembly as described in claim 2, further comprising a deflection absorbing bushing integrated into said pinion gear for accommodating misalignment between meshing of outwardly facing teeth of said pinon gear with those of said rotating sector plate.

4. The seatback assembly as described in claim 1, said pivoting seatback sector further comprising a pair of spaced apart sectors positioned on opposite sides of said stationary sector and said rotating sector plate, said cam supported between said pair of spaced apart sectors.

5. The seatback assembly as described in claim 1, further comprising a clock spring interposed about a pivot axis between said seatback and stationary sectors.

6. The seatback assembly as described in claim 1, further comprising a lever stacked upon said cam, both rotatable about a common pivot axis, said lever exhibiting an offset abutment surface which, when rotated in a selected direction, contacts an offset pin projecting from said cam in order to unseat said cam from abutting contact with said stationary sector.

7. The seatback assembly as described in claim 6, further comprising an actuating cable extending to a further pivotally offset location of said lever.

8. The seatback assembly as described in claim 1, said pivotal seatback sector further comprising a lower arcuate surface having first and second circumferentially offset abutment locations which selectively are displaced into contact with a pin projecting from said stationary sector to define a pivoting range of said seatback.

9. A power up/power down seatback assembly pivotally supported upon a seat bottom of a vehicle, said assembly including each of forward dump, rewind, and reset protocols and comprising:
   a fixed stanchion adapted to being secured to a floor of the vehicle;
   a seatback pivotally secured to said fixed stanchion, said seatback having a contact shoulder configured on an exterior edge proximate a main pivot established with said stanchion;
   a motor having an pinion drive gear secured to said seatback;
   a first rotatable sector and a second fixed sector mounted in sandwiched fashion over a seatback sector plate about said main pivot, each of said sectors having an exterior arcuate array of teeth interengageable with said pinion drive gear;
   a spring loaded cam pivotally secured to said stanchion, a pin extending from said cam and engaging said contact shoulder for maintaining said seatback in an upright design position; and
   upon said cam being rotated out of engagement with said seatback, said seatback rotating to a forward dump position, subsequent rotation of said pinion gear rotatably displacing said sector plate and said seatback in slaved fashion to retract said seatback to the upright design position, with a concluding and counter-rotation of said pinion gear counter-rotating and resetting said rotatable sector independently of said seatback to a final reset position.

10. The seatback assembly as described in claim 9, further comprising said pinon gear driving said seatback in each of a power up and power down direction.

11. The seatback assembly as described in claim 9, further comprising a pair of circumferential slots configured within said rotatable sector, fixed pins projecting from said stanchion for seating in said slots and defining a range of rotational adjustment of said sector.

12. The seatback assembly as described in claim 11, said stanchion further comprising a pair of inner and outer spaced stanchions supporting therebetween said seatback, fixed and rotatable sectors, and said cam.

13. The seatback assembly as described in claim 12, further comprising an arcuate slot configured in said outer spaced stanchion, a pin projecting from said rotatable sector through said arcuate slot.

14. The seatback assembly as described in claim 9, further comprising a clock spring for biasing a pivot point of said cam in a contact direction against said rotatable sector.

15. A power up/power down seatback assembly pivotally supported upon a seat bottom of a vehicle, said assembly including each of forward dump, rewind, and reset protocols and comprising:
- a fixed stanchion adapted to being secured to a floor of the vehicle;
- a seatback pivotally secured to said fixed stanchion, said seatback having a contact shoulder configured on an exterior edge proximate a main pivot established with said stanchion;
- a motor having an pinion drive gear secured to said seatback;
- said pinon gear driving said seatback in each of a power up and power down direction;
- a first rotatable sector and a second fixed sector mounted in sandwiched fashion over a seatback sector plate about said main pivot, each of said sectors having an exterior arcuate array of teeth interengageable with said pinion drive gear;
- a spring loaded cam pivotally secured to said stanchion, a pin extending from said cam and engaging said contact shoulder for maintaining said seatback in an upright design position;
- a clock spring for biasing a pivot point of said cam in a contact direction against said rotatable sector; and
- upon said cam being rotated out of engagement with said seatback, said seatback rotating to a forward dump position, subsequent rotation of said pinion gear rotatably displacing said sector plate and said seatback in slaved fashion to retract said seatback to the upright design position, with a concluding and counter-rotation of said pinion gear counter-rotating and resetting said rotatable sector independently of said seatback to a final reset position.

16. The seatback assembly as described in claim 15, further comprising a pair of circumferential slots configured within said rotatable sector, fixed pins projecting from said stanchion for seating in said slots and defining a range of rotational adjustment of said sector.

17. The seatback assembly as described in claim 16, said stanchion further comprising a pair of inner and outer spaced stanchions supporting therebetween said seatback, fixed and rotatable sectors, and said cam.

18. The seatback assembly as described in claim 16, further comprising an arcuate slot configured in said outer spaced stanchion, a pin projecting from said rotatable sector through said arcuate slot.

* * * * *